(12) United States Patent  
Hirayama et al.

(10) Patent No.: US 8,638,466 B2  
(45) Date of Patent: Jan. 28, 2014

(54) METHOD OF PLACING AN ORDER FOR PHOTOGRAPHIC PRINTING

(71) Applicant: FUJIFILM Corporation, Tokyo (JP)

(72) Inventors: Wataru Hirayama, Tokyo (JP); Maki Kurose, Chiba (JP); Kyouko Shiromizu, Kanagawa (JP); Kenji Hori, Tokyo (JP); Takeshi Dosaka, Tokyo (JP); Osamu Mito, Kanagawa (JP); Karin Kon, Kanagawa (JP); Takeshi Teraoka, Chiba (JP); Takuya Shimomura, Tokyo (JP); Yoshiji Endo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/628,722

(22) Filed: Sep. 27, 2012

(65) Prior Publication Data

US 2013/0022294 A1   Jan. 24, 2013

Related U.S. Application Data

(60) Division of application No. 13/447,804, filed on Apr. 16, 2012, now Pat. No. 8,300,257, which is a continuation of application No. 11/802,014, filed on May 18, 2007, now abandoned.

(30) Foreign Application Priority Data

May 19, 2006   (JP) .................................. 2006-140148  
May 19, 2006   (JP) .................................. 2006-140704  
May 23, 2006   (JP) .................................. 2006-143092

(51) Int. Cl.
| | |
|---|---|
| *G06K 15/00* | (2006.01) |
| *G06F 3/12* | (2006.01) |
| *H04N 1/46* | (2006.01) |
| *H04N 1/40* | (2006.01) |
| *G06Q 30/00* | (2012.01) |

(52) U.S. Cl.  
USPC ......... 358/1.16; 358/1.15; 358/537; 358/448; 705/14.23

(58) Field of Classification Search  
None  
See application file for complete search history.

(56) References Cited

U.S. PATENT DOCUMENTS

| | | | |
|---|---|---|---|
| 6,798,532 B1 | 9/2004 | Okino | |
| 6,965,868 B1 | 11/2005 | Bednarek | |
| 2003/0071900 A1* | 4/2003 | Aoyagi | ..................... 348/207.1 |
| 2003/0103060 A1* | 6/2003 | Anderson et al. | ............. 345/619 |

(Continued)

FOREIGN PATENT DOCUMENTS

| | | |
|---|---|---|
| EP | 1 298 522 A2 | 4/2003 |
| JP | 2002-259781 A | 9/2002 |

(Continued)

OTHER PUBLICATIONS

Notification of Reasons for Refusal, dated Aug. 2, 2011, issued in related JP Application No. 2007-092164, 5 pages in English and Japanese.

(Continued)

*Primary Examiner* — Thomas Lett  
(74) *Attorney, Agent, or Firm* — Sughrue Mion, PLLC

(57) ABSTRACT

In an image network system used for network print service which receives an order for printing or the like by using a communication network such as the Internet, there are provided a center server capable of providing service which is different depending upon points given to a customer according to an order track record, at a time of using the system, capable of suitably setting a storage capacity and a storage period of an image for a user without placing a burden on the user while importance is placed on an operational efficiency of the system, capable of allowing a user to upload images as many as possible in an album, and useful for prompting an order, and an image network system including the center server.

8 Claims, 21 Drawing Sheets

(56) References Cited

U.S. PATENT DOCUMENTS

| | | |
|---|---|---|
| 2004/0015407 A1 | 1/2004 | Sales et al. |
| 2004/0098320 A1 | 5/2004 | Mitsuhashi et al. |
| 2004/0160634 A1 | 8/2004 | Watanabe |
| 2005/0261979 A1 | 11/2005 | Cohen |
| 2006/0209214 A1* | 9/2006 | Fader et al. ................... 348/584 |

FOREIGN PATENT DOCUMENTS

| | | |
|---|---|---|
| JP | 2002-342741 A | 11/2002 |
| JP | 2002-366335 A | 12/2002 |
| JP | 2003-316900 A | 11/2003 |
| JP | 2003-330763 A | 11/2003 |
| JP | 2005-049933 A | 2/2005 |
| JP | 2005-322039 A | 11/2005 |

OTHER PUBLICATIONS

Communication, dated Aug. 24, 2007, issued in corresponding EP Application No. 07008779.6, 6 pages.

* cited by examiner

FIG. 4A

POINTS CURRENTLY AVAILABLE FOR USE FOR MR./MS. XX ARE <450 POINTS>. DO YOU WISH TO USE POINTS FOR EXPANSION OF ALBUM CAPACITY OR EXTENSION OF STORAGE PERIOD?

● YES   ○ NO

NEXT

FIG. 4B

EXPANSION OF STORAGE CAPACITY
 • 20 M BYTES (50 POINTS NEEDED)
EXTENSION OF STORAGE PERIOD
 • 12-DAY EXTENSION (50 POINTS NEEDED)
EXPANSION OF STORAGE CAPACITY AND EXTENSION OF STORAGE PERIOD
 • 10 M BYTES/5-DAY EXTENSION
  (50 POINTS NEEDED)

PLEASE SELECT ANY OF ABOVE.

NEXT

FIG. 4C

EXPANSION OF STORAGE CAPACITY
 • 20 M BYTES (50 POINTS NEEDED)
 • 40 M BYTES (100 POINTS NEEDED)
EXTENSION OF STORAGE PERIOD
 • 12-DAY EXTENSION (50 POINTS NEEDED)
 • 24-DAY EXTENSION (100 POINTS NEEDED)
EXPANSION OF STORAGE CAPACITY AND EXTENSION OF STORAGE PERIOD
 • 10 M BYTES/5-DAY EXTENSION
  (50 POINTS NEEDED)
 • 25 M BYTES/6-DAY EXTENSION
  (100 POINTS NEEDED)

PLEASE SELECT ANY OF ABOVE.   NEXT

FIG.12

IMAGE INFORMATION

◈IMAGE CODE

◇MEMBER ID
◇RETAILER ID
◇FILE FORMAT TYPE
◇IMAGE WIDTH (pixel)
◇IMAGE HEIGHT (pixel)
◇STORED FILE SIZE
◇STORED FILE PATH
◇STORED FILE NAME
◇UPLOAD DATE
◇UPLOAD FILE NAME
◇SCHEDULED IMAGE DISPLAY STOP DATE
◇SCHEDULED IMAGE DELETION DATE
◇INITIALLY-SCHEDULED IMAGE DELETION DATE
◇LATEST ORDER DATE
◇THUMBNAIL PATH
◇THUMBNAIL FILE NAME
◇THUMBNAIL FILE SIZE
◇VIEW IMAGE PATH
◇VIEW IMAGE FILE NAME
◇VIEW IMAGE FILE SIZE
◇PREMIUM STORAGE FLAG
◇PREMIUM STORAGE START DATE
◇DELETION FLAG
◇DATE AND TIME OF NEW CREATION
◇DATE AND TIME OF UPDATE

FIG.13

ALBUM SETTING SCREEN

PLEASE SELECT ANY OF THE FOLLOWING COURSES.

- CAPACITY-WEIGHTED (50 M/10 DAYS)

- PERIOD-WEIGHTED (10 M/50 DAYS)

- PREMIUM STORAGE (5 M/STANDARD 50 DAYS, PREMIUM 150 DAYS)

NEXT

FIG. 20

IMAGE INFORMATION

| IMAGE CODE |
| --- |
| MEMBER ID |
| RETAILER ID |
| FILE FORMAT TYPE |
| IMAGE WIDTH (pixel) |
| IMAGE HEIGHT (pixel) |
| STORED FILE SIZE |
| STORED FILE PATH |
| STORED FILE NAME |
| UPLOAD DATE |
| UPLOAD FILE NAME |
| SCHEDULED IMAGE DISPLAY STOP DATE |
| SCHEDULED IMAGE DELETION DATE |
| INITIALLY-SCHEDULED IMAGE DELETION DATE |
| LATEST ORDER DATE |
| THUMBNAIL PATH |
| THUMBNAIL FILE NAME |
| THUMBNAIL FILE SIZE |
| VIEW IMAGE PATH |
| VIEW IMAGE FILE NAME |
| VIEW IMAGE FILE SIZE |
| DELETION FLAG |
| DATE AND TIME OF NEW CREATION |
| DATE AND TIME OF UPDATE |

METHOD OF PLACING AN ORDER FOR PHOTOGRAPHIC PRINTING

This application is a divisional of U.S. application Ser. No. 13/447,804, filed Apr. 16, 2012, which is a continuation of U.S. application Ser. No. 11/802,014, filed May 18, 2007, now abandoned, which claims priority from JP 2006-140148 and JP 2006-140704, both filed May 19, 2006, and JP 2006-143092, filed May 23, 2006, each incorporated herein by reference in its entirety.

The entire contents of the document cited in this specification are herein incorporated by reference.

BACKGROUND OF THE INVENTION

The present invention relates to a center server for placing an order for photograph printing which uses a communication network such as the Internet, and an image network system including the center server.

In recent years, digital cameras have rapidly gained in popularity. Communication networks such as the Internet have also come into wide use.

An image shot with a digital camera is treated as digital image data. Thus, the image can be transmitted through the communication network, and various services have been proposed/deployed by using the communication network.

For example, JP 2005-49933 A discloses a system which enables, in a network photograph service for storing an image (image data) of a service user in a server connected by using a communication network such as the Internet and for publicly offering this image to a third party, the load on a service operator to be reduced by counting the image data amount for each customer, changing service contents such as expiration date or storage amount according to the user's state of use, and sending an error message to inhibit further transfer/storage of images when the amount of image data exceeds the maximum storage amount irrespective of whether the image data is for an unordered image or an ordered image.

JP 2002-342741 A discloses a system of an digital album in which images sent from service users by using the same communication network are stored/managed in a server on a user unit basis, and provided as an digital album through the network, and when nothing is transmitted from users for a predetermined period or longer, the images registered by the users are deleted to enable effective use of a data storage area of server resources or the like.

Further, JP 2003-330763 A discloses an information processing system for deleting images in a predetermined cycle. In the system, a storage period is set for an image at the time of uploading the image, and when the storage period has passed, the image whose storage period has passed is retrieved regularly by using a system timer in the server which is preset, or the like, thereby deleting the corresponding image. This system is capable of setting the conditions as to the storage periods of images by allowing a user to set predetermined starting points of the storage periods, so images can be deleted effectively.

In addition, photofinishers deploy so-called network printing services in which the photofinishers obtain images shot by customers and print order information using the communication network to create photographic prints having the images reproduced thereon according to the order information, and provide the prints created according to the received order to the customers by delivering them home or to designated shops.

In a commercial transaction in a virtual market using a conventional communication network, a point system in which points are given according to a commercial transaction record is deployed as shown in JP 2002-259781 A. Such point system has been widely introduced even to the field of photograph print ordering by network printing services.

SUMMARY OF THE INVENTION

In the conventional point system described above, points which have been accumulated according to a commercial transaction record established by a customer in a virtual market on a network are converted into a monetary value, and the customer can use the monetary value in purchasing another commodity product. In other words, the points are merely worth a value of money.

Also, in the conventional network print service described above, images transmitted by users to a server are managed and stored as an album (i.e., digital album) for each user. In general, the storage period of an image and the maximum storage capacity of the album are uniquely set by the system, and images can be stored in the album such that a sum of the data sizes of all the images for each user does not exceed the maximum storage capacity. Further, in a case where the maximum storage capacity of the album is to be exceeded if a user additionally transmits another image so as to be stored in the album, an error message is transmitted in order to prohibit the user from transmitting the image.

The above-mentioned capacity management method does not allow a user to choose the storage period and the maximum storage capacity for images in an album. Also, according to the system disclosed in JP 2003-330763 A, a user is allowed to set a starting point of the storage period, but is not allowed to set the length of the storage period and the storage capacity.

There exists service which allows a user to extend and to expand the storage period and the storage capacity, respectively, with an additional charge. In this case, however, a financial burden is placed upon the user.

Further, according to the above-mentioned capacity management method, the maximum storage capacity for images is uniformly set regardless of the order track record of an amount of orders of prints (e.g., photographs) or the like achieved by each user. However, there is a demand for providing better service for a user who has placed a large number of orders, to thereby stimulate the placement of orders.

There is also a problem that in the case where a user is prohibited from transmitting an image due to an excess of the maximum storage capacity of the album, if the user is unskilled in operation, the user may not be able to store a new image without knowing how to transmit the image.

A first object of the present invention is to solve the above-mentioned problems of the conventional techniques, and to stimulate placement of orders through the network print service by the following manner in a network print service which receives orders or the like by using a communication network such as the Internet. That is, points accumulated by a customer are not only converted into a monetary value but are also used for providing a wide range of services including providing a customer having a larger number of accumulated points with more benefits in terms of the use of the network print service system, thereby providing better service to a customer having a better order track record.

Specifically, in an image network system used for network print service or the like, the first object of the present invention is provide a center server which employs a point system in which points accumulated in accordance with an order track record are regarded as a credit value of a client and the points thus accumulated can be used for receiving service, and an image network system including the center server.

Further, a second object of the present invention to provide a center server of an image network system, in which a storage capacity and a storage period can be suitably set for a user while importance is placed on an operational efficiency of the system, and an image network system including the center server.

Further, in an image network system used for network print service which receives an order or the like by using a communication network such as the Internet, a third object of the present invention is to provide a center server in which a user, in particular, a user who has placed a large number of orders such as print, can upload images as many as possible and which stimulates placement of orders; and an image network system including the center server. In addition, the third object of the present invention is to provide a center server which is easy to handle so as to allow a user to smoothly store a desired image in an album even in a case where a maximum storage capacity is exceeded and is thus excellent in operability; and an image network system including the center server.

In order to achieve the above-mentioned first object, according to a first aspect of the present invention, there is provided a center server for an image network system, for receiving image data and an order from an order entry channel via a communication network, including:

an order reception function block receiving an order from the order entry channel;

an image storage function block storing image data supplied from the order entry channel according to a predetermined storage condition;

a capacity management function block managing a storage capacity for the image data stored by the image storage function block on a customer basis; and a point management function block managing points which are given based on the order placed by a customer on a customer basis, wherein the point management function block changes the predetermined storage condition in the image storage function block based on a status of points of each customer.

In the above center server, preferably, the point management function block causes the order entry channel to display choices for the predetermined storage condition in the image storage function block based on the status of points of each customer, and changes the predetermined storage condition according to a choice selected by the customer from among the choices displayed.

Further, preferably, the choices for the predetermined storage condition include at least one of a setting change of a storage capacity and a setting change of a storage period, of the image data storable in the image storage function block.

Further, preferably, the point management function block counts total points by accumulating points that have been obtained by the customer in a predetermined period, and changes the predetermined storage condition of the image data provided to the customer based on the total points.

Further, preferably, the point management function block automatically changes the predetermined storage condition in the image storage function block according to total points obtained by accumulating points that have been obtained by the customer in a predetermined period.

In the above center server, preferably, the point management function block automatically changes the predetermined storage condition, so that one of a change of a storage capacity, a change of a storage period, and a change of the storage capacity and the storage period is performed. Further, preferably, the point management function block automatically expands the predetermined storage condition in the image storage function block when the total points reach a predetermined number. Further, preferably, the point management function block automatically expands the predetermined storage condition, so that one of an expansion of a storage capacity, an extension of a storage period, and the expansion of the storage capacity and the extension of the storage period is performed.

Further, preferably, the image storage function block stores image data based on a combination of a data amount and a storage period of the image data stored, by using retention counts, one retention count of the retention counts being defined by assuming storage of image data having a predetermined data amount in the image storage function block for a predetermined period. Further, preferably, the point management function block sets the predetermined storage condition in the image storage function block by converting the points of each customer into the retention counts and calculating a storage condition corresponding to the number of the retention counts.

Further, preferably, when the image data is supplied from the order entry channel, in a case where a storage capacity for the image data for a customer is insufficient, the capacity management function block transmits information indicating that the storage capacity for the customer is insufficient to the order reception function block; and the order reception function block having received the information indicating that the storage capacity for the customer is insufficient causes the order entry channel to display thereon information on insufficient storage capacity and choices for a process for securing a storage capacity.

Further, preferably, the choices displayed on the order entry channel by the capacity management function block include a reselection of the image data to be supplied to the image storage function block and a deletion of image data within the image storage function block; and in a case where the number of points of a customer is equal to or larger than a predetermined value, an expansion of the storage capacity of the image storage function block is further displayed as a choice.

Further, preferably, the image storage function block gives an order identifier to the image data supplied from the order entry channel and stores the image data, the order identifier identifying whether the image data is an ordered image data which has been ordered before, or an unordered image data which has never been ordered; the order reception function block receives an order of the image data supplied from the order entry channel on a customer basis and manages the order; and the capacity management function block obtains a total value of sizes of the unordered image data among the image data stored by the image storage function block based on the order identifier on a customer basis, and manages whether or not the total value is within such a range as not to exceed a predetermined upper limit value.

Further, preferably, the order reception function block receives an order of the image data supplied from the order entry channel on a customer basis and manages the order; the capacity management function block obtains a total value of sizes of the image data stored by the image storage function block on a customer basis, and manages whether or not the total value is within such a range as not to exceed a predetermined upper limit value; and in a case where the capacity management function block judges that the total value exceeds the predetermined upper limit value, the capacity management function block notifies the order entry channel thereof and causes the order entry channel to display thereon choices for a countermeasure for preventing the total value from exceeding the predetermined upper limit value.

In order to achieve the above-mentioned second object, according to a second aspect of the present invention, there is provided a center server for an image network system, for receiving image data and an order from an order entry channel via a communication network, including:

an image storage function block storing image data supplied from the order entry channel, wherein the image storage function block stores the image data based on a combination of a data amount and a storage period of the image data stored, by using retention counts, one retention count of the retention counts being defined by assuming storage of image data having a predetermined data amount in the image storage function block for a predetermined period.

In the above center server, preferably, the image storage function block includes at least one condition selected from the group consisting of a first condition of a large storage capacity with a short storage period, a second condition of a small storage capacity with a long storage period, and a third condition of storage of an image data designated by a customer for a period which is long in comparison with a normal storage period, as a storage condition of image data, each of the first condition, the second condition, and the third condition using a same number of retention counts.

Further, preferably, the image storage function block is capable of changing setting of the storage capacity and the storage period within a range of the retention counts retained by the customer.

Further, preferably, the center server according to the present invention, further including: an order reception function block receiving an order of image data supplied from the order entry channel on a customer basis and managing the order; and a point management function block managing points given to a customer based on the order which is placed by a customer and is received by the order reception function block, on a customer basis. Further, preferably, the image storage function block is capable of converting the points which is retained by the customer and is managed by the point management function block into retention counts, and storing image data in exchange of the retention counts.

Further, preferably, the center server, further including an extended storage image selection function block setting image data designated by a customer as an extended storage image data, wherein the image storage function block converts points of a customer into the retention counts, and sets a storage period which is obtained by adding an extended storage period calculated based on the number of the retention counts and a data amount of the extended storage image data to a normal storage period as a storage period of the extended storage image data set by the image storage function block.

Further, preferably, when total points which are managed by the point management function block and are obtained by accumulating points that have been obtained by the customer in a predetermined period reach a predetermined value, the image storage function block gives a predetermined number of retention counts to the customer, and resets a storage condition based on the predetermined number of retention counts. Further, preferably, the center server further including: a count setting function block setting a part of the predetermined number of retention counts given by the image storage function block to extended retention counts serving as retention counts used for storage of the extended storage image data for an extended storage period, the extended storage image data being selected by the extended storage image selection function block, wherein the image storage function block uses the extended retention counts set by the count setting function block to set a storage period for the extended storage image data after a predetermined storage period.

Further, preferably, the image storage function block is capable of converting the retention counts retained by the customer into points of the customer.

In order to achieve the above-mentioned third object, according to a third aspect of the present invention, there is provided a center server for an image network system, for receiving image data and an order from an order entry channel via a communication network, including:

an image storage function block giving an order identifier to image data supplied from the order entry channel and storing the image data, the order identifier identifying whether the image data is ordered image data which has been ordered before or unordered image data which has never been ordered;

an order reception function block receiving an order of the image data supplied from the order entry channel on a customer basis and managing the order; and a capacity management function block obtaining a total value of sizes of the unordered image data among the image data stored by the image storage function block based on the order identifier on a customer basis, and managing whether or not the total value is within such a range as not to exceed a predetermined upper limit value.

Further, in the above center server, preferably, in a case where the capacity management function block judges that the total value exceeds the predetermined upper limit value, the capacity management function block notifies the order entry channel thereof and causes a display device (e.g., display) which the order entry channel includes to display thereon choices for a countermeasure for preventing the total value from exceeding the predetermined upper limit value.

Further, preferably, the choices displayed on the order entry channel include at least one selected from the group consisting of a reselection of image data to be supplied to the image storage function block, a deletion of unordered image data stored in the image storage function block, an order of the unordered image data stored in the image storage function block, an image size conversion of the unordered image data stored in the image storage function block, a compression of the unordered image data stored in the image storage function block, and a file format conversion of the unordered image data stored in the image storage function block.

Further, preferably, in a case where one of the choices displayed on the order entry channel including at least one selected from the group consisting of the deletion of the unordered image data stored in the image storage function block, the order of the unordered image data stored in the image storage function block, the image size conversion of the unordered image data stored in the image storage function block, the compression of the unordered image data stored in the image storage function block, and the file format conversion of the unordered image data stored in the image storage function block, is selected, the capacity management function block causes the order entry channel to display thumbnail images of the unordered image data stored in the image storage function block.

Further, preferably, the capacity management function block gives a process identifier indicating an executed process content to an image data on which one of the image size conversion, the compression, and the file format conversion has been executed based on one of the choices selected; and the capacity management function block causes the order entry channel to display thereon the process content based on the process identifier when causing the order entry channel to display the thumbnail images.

Further, preferably, the capacity management function block causes the order entry channel to display the thumbnail images of the unordered image data stored in the image storage function block in one of a file size order and an order of date on which the unordered image data is supplied to the image storage function block.

Further, in the third aspect of the present invention, there is provided a center server for an image network system, for receiving image data and an order from an order entry channel via a communication network, including:

an image storage function block storing image data supplied from the order entry channel;

an order reception function block receiving an order of the image data supplied from the order entry channel on a customer basis and managing the order; and a capacity management function block obtaining a total value of sizes of the image data stored by the image storage function block based on a customer basis, and managing whether or not the total value is within such a range as not to exceed a predetermined upper limit value, wherein in a case where the capacity management function block judges that the total value exceeds the predetermined upper limit value, the capacity management function block notifies the order entry channel thereof and causes the order entry channel to display thereon choices for a countermeasure for preventing the total value from exceeding the predetermined upper limit value.

Further, preferably, the choices displayed on the order entry channel include at least one selected from the group consisting of a reselection of the image data to be supplied to the image storage function block, a deletion of the image data stored in the image storage function block, an image size conversion of the image data stored in the image storage function block, a compression of the image data stored in the image storage function block, and a file format conversion of the image data stored in the image storage function block.

Further, preferably, the image storage function block stores image data based on a combination of a data amount and a storage period of the image data stored, by using retention counts, one retention count of the retention counts being defined by assuming storage of image data having a predetermined data amount in the image storage function block for a predetermined period.

Further, in the fourth aspect of the present invention, there is provided an image network system including:

an order entry channel receiving an order from a customer and transmitting order information and customer information of the order; and any of the above center servers.

According to the present invention as described above, in the network print service for storing an image received from a customer through a communication network such as the Internet, and receiving a print order thereof or another such order to manufacture a corresponding product, an optional service can be provided based on an order track record of the customer obtained thus far. Accordingly, it is possible to realize the center server that can provide a higher level of service to the customer who has a good order track record, and an image network system including the center server.

Further, the image data can be expanded in its storage capacity and changed in its storage period according to the order track record of a customer. Accordingly, the customer with a better order track record is allowed to store more images for a longer period, which promotes the customer to place more orders through the network print service. Further, by setting the effective period during which a customer can receive service, it is possible to provide a higher level of service to a customer who currently has a good order track record, which further promotes a customer to place more orders.

Further, in a case of uploading an image to order, if the number of points of a customer is equal to or larger than a predetermined value, expansion of the storage capacity for the image data can be selected as a measure to support the customer. Accordingly, a customer with a good order track record does not need to delete or reselect the image due to unexpected shortage of the capacity, and is allowed to upload a new image at ease.

Further, to store the image in the center server, a user is caused to select settings regarding storage thereof in the center server from the plurality of choices including a combination of the storage capacity and the storage period. Accordingly, the user is allowed to store the image in a desired manner.

Further, preferably, the choices are set so that a product of the storage capacity and the storage period has a substantially constant value. Accordingly, whichever settings the user may select, the load placed on the center server is kept substantially constant, which can provide a stable image network system.

Further, preferably, a user can change the storage capacity and the storage period according to the data sizes of the images stored by the user or the like within the range in which the product of the storage capacity and the storage period does not exceed the upper limit set in the center server. Thus, the user is allowed to store the images in a desired manner according to the storage conditions of the images.

Further, the order track record of the user is regarded as a credibility of the user, and more choices for the settings regarding the storage are displayed based on the credibility of the user when a new image is to be stored in the center server. Accordingly, it is possible to provide a higher level of service to the user having a high credibility and prevent the user having a low credibility from intentionally occupying a server space.

Further, the center server and the image network system including the center server store images transmitted from the user in an digital album, obtain a total value of data sizes of only unordered images among the images stored within the center server with ordered images excluded from, the data size of the album to be checked, perform capacity management for the images within the center server based on whether or not the total value exceeds a maximum storage capacity, and notify the user of a data size that can be transmitted. Accordingly, the user is allowed to upload more images to the center server by placing a print order thereof or another such order. This also promotes the user to order the print or the like.

Further, when an image is to be uploaded to the center server, if the data size exceeds the capacity, it is preferable to present the user with a countermeasure for transmitting the image instead of merely inhibiting the transmission of the image. Therefore, the user is allowed to select and execute the countermeasure on the spot and smoothly upload the desired image. Consequently, the user is allowed to smoothly store the image into the album in a desired manner.

BRIEF DESCRIPTION OF THE DRAWINGS

In the accompanying drawings:

FIG. 4A is a diagram showing an example of a screen which is displayed on an order entry channel at the time of sign-in;

FIG. 4B is a diagram showing another example of the screen which is displayed on the order entry channel at the time of sign-in;

FIG. 4C is a diagram showing still another example of the screen which is displayed on the order entry channel at the time of sign-in;

FIG. 12 is an example of an image information table for managing image information in the image network system shown in FIG. 1;

FIG. 13 is a diagram showing an example of an album setting screen which is displayed on the order entry channel at a time of setting an album;

FIG. 20 is an example of an image information table for managing image information in the image network system shown in FIG. 19;

DETAILED DESCRIPTION OF THE PREFERRED EMBODIMENTS

A center sever of the present invention and an image network system including the center server will be described in detail below according to preferred embodiments shown in the accompanying drawings.

Figure 1:
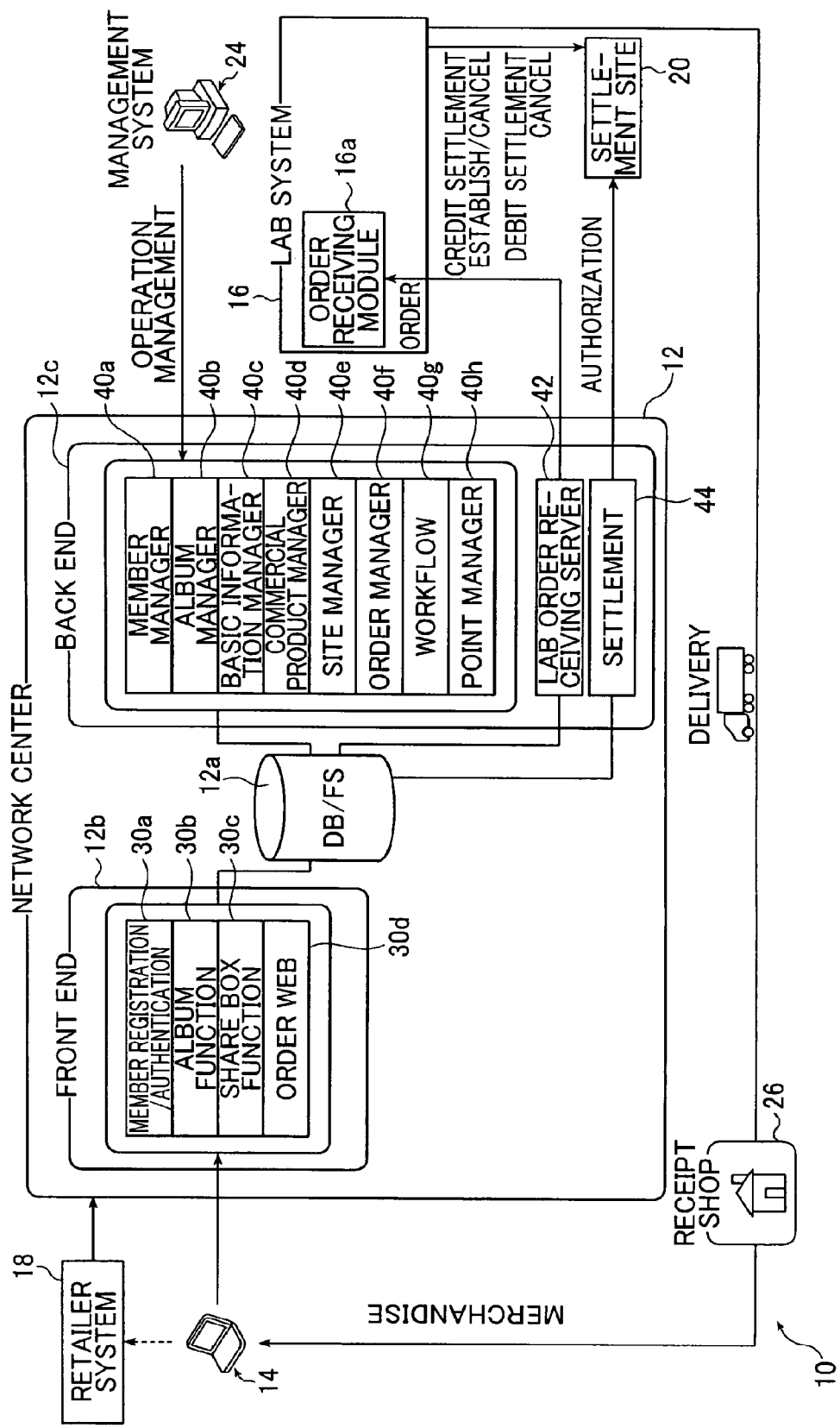
FIG. 1 is a diagram schematically showing a system configuration of an image network system using a center server according to the present invention.

FIG. 1 conceptually shows the configuration of the image network system of the present invention using the center server of the present invention.

The image network system 10 of the shown example (hereinafter referred to as "network system 10") deploys a so-called network printing service (online printing service) which includes receiving an order of photograph printing from a customer through a communication network such as the Internet, and creating prints according to the order, and also deploys a so-called digital album service which includes storing/managing an image (image data) transferred from the customer to enable image viewing.

In the present invention, there is no specific limitation on the format of image data, and for example, image data in publicly known formats such as JPEG, RAW, TIFF, and EXIF can be used.

The network system 10 basically includes a network center 12 which includes the center server of the present invention and collectively controls/manages the network system 10, an order entry channel 14 from which the customer places an order for printing or other operation, a lab system 16 owned by a photofinisher (hereinafter referred to as "lab"), and a retailer system 18 which serves as an intermediary between the customer and the lab.

In the network system 10 of the shown example, the network center 12, the order entry channel 14, the lab system 16, and the retailer system 18 are interconnected through a communication network such as the Internet. In the network system 10, the network center 12, the order entry channel 14, and the retailer system 18 are interconnected through a communication network made public such as the Internet. However, only the lab system 16 may be connected to the network center 12 through a dedicated communication line without being connected to the order entry channel 14 or the retailer system 18.

In the shown example, to clearly show the configuration of the network system 10, the drawing was simplified to show only one each of three types of the order entry channel 14, the lab system 16, and the retailer system 18. However, the present invention is not limited thereto.

Therefore, the network system 10 may include a plurality of lab systems 16. Usually, the network system 10 includes a plurality of retailer systems 18. The retailer system 18 is not an indispensable system in the present invention.

The order entry channel 14 is a user terminal which enables reception of a customer's printing order, and transfer of an image (uploading of the image) to the network center 12.

In the network system 10 of the shown example, customers include members registered in the network system 10 and nonmembers not registered therein. In the network system 10 of the shown example, each of the members necessarily belongs to any of the retailer systems 18.

The order entry channel 14 is basically configured by using a personal computer (hereinafter, called "PC") of the customer connectable to the communication network, or a printing order terminal which is installed at a shop receiving printing orders and is connected to the communication network.

Examples of the order entry channel 14 include an order entry channel that uses a web browser such as Internet Explorer™ from Microsoft Corporation to access (connect with) the network center 12 (website managed by the network center 12 and made public through the communication network), an order entry channel that uses an ordering function installed in an operating system of PC such as "Online Printing Wizard (OPW)" of Windows XP™ from Microsoft Corporation, an ordering function included in a general-purpose application such as "FinePix viewer" from FUJIFILM Corporation, an ordering function set in a website which is made public through the communication network such as "MSN (Europe)" which is a website managed/nm by Microsoft Corporation, and the like, and an order entry channel that uses order software which is dedicated order application (software) for ordering a product in the network system 10.

One order entry channel 14 may of course correspond to one, or two or more of the above examples.

The retailer system 18 serves as an intermediary between a customer and a lab, and includes, for example, a PC, a workstation (WS), or a server device.

In the European photographic printing industry, there are intermediary agents called retailers between customers and labs. A retailer makes a contract with a lab, and asks a retail shop such as a cosmetic store or a drugstore to set a printing order reception window. Upon reception of a printing order from a customer, the retailer transfers the received printing order to the lab. When necessary, the retailer receives finished prints from the lab and sends the prints to the shop having the designated reception window or customer's home. A lab is normally associated with a plurality of retailers. The lab receives customer's printing orders from the retailers to create prints.

In a distribution system of printing order/creation/reception, the lab is a kind of background existence which the customer is unaware of. The customer only contacts the retailer to order printing and to receive finished prints.

The retailer system 18 serves as a retailer in the network system 10. For example, this retailer system 18 is owned by the above described retailer.

As described above, the retailer system 18 is connected to the network center 12, the order entry channel 14, and the lab system 16 through the communication network such as the Internet. The retailer system 18 makes public a web screen for accessing the network center 12 from the order entry channel 14 in the communication network (on the web).

The order entry channel 14 may access the network center 12 through the web screen made public by the retailer, or may directly access the network center 12 not through the web screen. Alternatively, the configuration may be such that the setting whether to access the network center 12 through the web screen or not through the web screen is determined depending upon the type of the order entry channel 14 or the retailer.

By intervening the retailer system 18, in the network system 10 of the present invention, the customer can place an order for printing with a feeling of placing an order for printing with the retailer without being aware of the network center 12 and the lab (lab system 16).

In the network system 10 of the present invention, the retailer system 18 and the lab system 16 to be described later may be integrated into one system.

The network center 12 controls the overall network system 10 and is configured by combining a PC, a WS, a network device, a server device, and a storage device, for example.

The network center 12 includes a database/file server (DB/FS) 12a for saving/managing images and various pieces of information such as images sent from customers, member information, information on printing orders, and information for managing and operating the network system 10.

As conceptually shown in FIG. 1, the network center 12 includes a front end 12b (hereinafter, called "front end") and a back end 12c (hereinafter, called "back end").

The front end is a site for receiving customers' orders, and can be accessed from the order entry channel 14. In other words, the front end provides such a function as a user interface which enables the customer to place an order for printing or upload an image.

The back end is a site for managing the network system 10 and the network center 12. Accordingly, only the systems for managing/operating the network system 10, such as a management system 24 for managing the network center 12, the retailer system 18, and the lab system 16, can access the back end. Access from the order entry channel 14 is inhibited.

In the network center 12, the front end includes a member registration/authentication block 30a, a digital album function block 30b, a share box function block 30c, and an order web block 30d.

The customer can use the order entry channel 14 to access the front end of the network center 12, thereby using the following functions.

The member registration/authentication block 30a (hereinafter, called "member registration/authentication") provides functions of registering members, changing registered member information, and authenticating (sign-in) members. In the illustrated network center 12, authentication is carried out by using a member ID (identification information such as an identification number) and a password set for each member. The member information is managed by a member manager of the back end described below.

The retailer system 18 may also have functions for member registration/authentication/sign-in conforming thereto. Accordingly, when the order entry channel 14 accesses the network center 12 through the retailer system 18, in the case where a member signs in in the retailer system 18 before accessing the network center 12, the sign-in of the member is not executed in the front end.

The digital album function block 30b (hereinafter, called "album function") provides a function of uploading an image through the order entry channel 14, a function (image storage function block) of storing images of each member as an album (digital album), a function (function which enables the member to view his/her own album) which enables the member to display an album image through the order entry channel 14, and a function which enables the member to rotate the displayed album images or view them in a slide show. In other words, the album function provides a digital album function through the communication network.

The album includes a system album and a My Album. The system album stores images uploaded by the member. The network center 12 automatically creates one system album for each member at the initial period (for example, at the time of member registration). The images uploaded by the member are all stored in the system album.

On the other hand, the My Album is an album optionally created by the member to optionally store uploaded images all together.

In each album, the display period and the storage period for each image are set by a later-described album manager. Displaying of an image whose display period has passed is stopped, and an image whose storage period has passed is deleted from the album. The display period and the storage period may be the same or different from each other.

The image uploaded through the order entry channel 14 is managed based on image information including an image code for specifying the image, a member ID, a retailer ID, a file format type, a stored file size, a stored file name, an upload date, and a latest order date. The network center 12 includes an image information table for managing such image information, which will be described later.

In the network system 10 shown in FIG. 1, the member can use the album function to carry out various album operations and album image editing.

Exemplary album operations that may be carried out include creating a new My Album, setting/changing the title of the My Album, displaying the album list, and deleting the My Album. The member cannot delete the system album.

Examples of the album image editing that may be carried out include displaying all images in an album in a slide show, displaying a thumbnail image list, displaying an enlarged image, displaying a rotated image, adding an image, changing the image display order, changing the image name, copying or moving an image to another album (a plurality of images or all images may be selected for this operation), deleting an image (a plurality of images or all images may be selected for this operation), and placing an order for a product such as a print from an image stored in the album.

The share box function block 30c (hereinafter, called "share box function") provides a function which enables the member to publicly offer his/her own album image to a third party. The member can use the share box function to create one or more share boxes for publicly offering to the third party an arbitrary number of images selected from the album. The images in the share box may also be publicly offered to the third party by providing the URL for viewing these images to an acquaintance or other person.

Displaying (viewing) of images stored in the album and the share box is only allowed for a predetermined period, and the images are also stored in the album and the share box for a predetermined period.

In addition to the album and the share box, the front end of the network center 12 includes the photo storage which provides a function of storing for a predetermined period, images uploaded by nonmembers to order prints. The images stored in the photo storage can be displayed during the ordering operation. After the end of ordering, however, the images cannot be displayed.

The order web block 30d (hereinafter, called "order web") provides a function of receiving orders for products including a print, fun goods such as a mug and a T-shirt having an image recorded thereon, and a CD having an image recorded thereon.

The order web is accessed from the order entry channel 14 to select a product (print, fun goods, a CD, or the like) and an image for which a product is to be ordered, and when an order for printing is placed, the print size and the quantity are input/instructed. The destination (receipt shop) where the product is to be received or the delivery destination, and the payment method are also input/instructed as required in the order web.

In the network system 10 of the shown example, the member places an order (selects an image for which a product is to be ordered) using the order web in an album mode or a menu mode.

The album mode is a mode in which an image to be ordered is selected from the images stored in the album. The menu mode is a mode in which images are uploaded through the order entry channel 14 and an image to be ordered is selected from the uploaded images. Irrespective of whether or not an order is placed, the images uploaded by the member are stored in the system album. In other words, the order web also provides an image upload function.

A mode similar to the menu mode is only applicable when a nonmember places an order using the order web, and the uploaded images are stored in the photo storage as described above.

It is also possible in the network system 10 to select an image from the images stored in the share box through the order entry channel 14 and place an order for a product.

On the other hand, the back end of the network center 12 is a site where the network system 10 and the network center 12 are managed as described above. The back end includes a member management block 40a, an album management block 40b, a basic information management block 40c, a commercial product management block 40d, a site management block 40e, an order management block 40f, a workflow block 40g, a lab order receiving server 42, a settlement block 44, and a point management block 40h.

The member management block 40a (hereinafter, called "member manager") provides a function of managing member information such as managing member information (including management in registration of new members, and changing/adding/updating of various pieces of information) and retrieving member information.

Examples of the information of a member include a member ID, a password, an E-mail address, an ID (selected shop ID) of a receipt shop 26 (hereinafter, called "receipt shop") where a product is received, a name, an address, a telephone number, and a delivery destination.

The retrieval of the member information is to provide the function in which the retailer system 18 retrieves a member according with a given condition.

The album management block 40b (hereinafter, called "album manager") provides a function (capacity management function block) of managing the maximum storage capacity of the album, the share box, the photo storage, and the like, and the storage period and the display period of an image.

In response to the request from the retailer system 18 or the lab system 16, the album manager sets the album maximum storage capacity, the image storage period, and the image display period per member for each retailer system 18 or each lab system 16. In other words, the retailer system 18 or the lab system 16 (retailer or lab) can set the album capacity, the image display period, and the image storage period. The display period and the storage period may be the same or different.

The album manager stops displaying an image whose display period has expired. Also, the album manager stops displaying an image whose storage period has expired, and thereafter, deletes the image at a predetermined timing. The member may be notified of expiration of the display period or the like by E-mail or other means.

In the network system 10, the display period and/or storage period may be changed depending on whether or not a product was ordered for the image (e.g., the period may be extended depending on whether or not an order was placed). The display period and/or storage period may also be different between members and nonmembers.

The album manager periodically deletes a My Album, a photo storage, and a share box which do not store any images. In addition, the album manager forcibly stops offering to public a share box which store images offending public order and morals.

The basic information management block 40c (hereinafter, called "basic information manager") provides a function of managing various pieces of basic information of the lab system 16, the retailer system 18, and the receipt shop.

The basic information manager registers/manages the retailer system 18 (retailer having the retailer system 18) associated with each lab system 16 (lab having the lab system 16) in relation to the receipt shop associated with each retailer system 18, manages the basic information of the lab systems 16, retailer systems 18, and receipt shops, and changes/updates the basic information as necessary or upon request.

The commercial product management block 40d (hereinafter, called "commercial product manager") provides a function of managing products handled by the lab which has the lab system 16, the retailer which has the retailer system 18, and the receipt shop.

In the illustrated network system 10, for example, a (photographic) print on which an image received from a member or a nonmember is reproduced, a CD having the image stored thereon, and fun goods (e.g., a mug and a T-shirt) having the image reproduced thereon are provided as products to a customer. The commercial product manager provides a function of setting products (commercial products) to be handled by the retailer system 18 or the lab system 16, a function of setting prices of the products, and a function of displaying the products on the order web. The commercial product manager also provides a function of generating order setting information (image, commercial product type, print size, quantity, and the like) which is order information, according to an order for a product placed by the customer using the order entry channel 14 (more specifically according to the input/instruction of the order).

Products to be handled and prices of the products can be applied/set for each retailer system 18 or each lab system 16 by the function of the commercial product manager. In other words, the retailer and the lab can set products to be handled and prices of the products.

The site management block 40e (hereinafter, called "site manager") provides management functions for a manager of retailers and for a lab manager for operating the network system 10, such as announcement information to the customer, statistical information, and application downloading information, and a management function for a center manager (operator) serving as the window to a lab operation manager in the network system 10.

The order management block 40f (hereinafter, called "order manager") provides a function (order reception function block) of managing an order, such as generation, retrieval, or displaying of order information.

In the order manager, when a customer places an order, and the order is completed (established) after the customer selects the method of receiving the product or the payment method, or the like, the order manager executes necessary calculation such as calculation of charges using, for example, the order setting information or the like to generate predetermined information, thereby generating order information. Further, the order manager sends the order information generated to the lab order receiving server.

The workflow block 40g (hereinafter, called "workflow") provides a workflow function for changing a setting of a price/product in operating and managing the network system 10.

When the retailer system 18 or the lab system 16 applies for changing of retailer or lab information (basic information and detailed information), changing of charges, or changing of information on a receipt shop, the workflow judges whether the application is appropriate and decides approval or rejection. When approved, the changing applied for is confirmed, and changing contents are applied to the network system 10.

The lab order receiving server 42 (hereinafter, called "lab order receiving server") provides to the lab system 16 via a lab order receiving module 16a to be described below, a function of receiving an order in the lab system 16, including transmission of order information and an image.

As described above, the order information is sent to the lab order receiving server, and image data corresponding to the order information is also sent to the lab order receiving server (order information for one order and its corresponding image data will be hereinafter collectively referred to as "order job"). The lab order receiving server transfers order list information to the lab system 16 in response to a request from the lab system 16, and an order job for one order requested from the lab system 16 is transferred to the lab system 16.

The settlement block 44 (hereinafter, called "settlement") provides a function of obtaining card authorization (credit) from a settlement site 20 when credit card payment or debit card payment is selected for the payment method.

The settlement site 20 is a web site which is connected to the network center 12 through the communication network and which is used to execute well-known online settlement. In the network center 12, only authorization acquisition is carried out for the settlement site.

The network system 10 employs a point system in which points are given to a member (customer who has registered as a member) depending upon the order track record of each member. Whereby, a member who has accumulated predetermined points or more can receive various services according to the number of the points. The number of points given is set depending upon the total charge of the orders. Alternatively, the number of points given may be set according to a product or a delivery method in the network system 10, the retailer system 18, or the lab system 16.

The point management block 40h (hereinafter, called "point manager") is for managing the point system, and provides a function (point management function block) of managing points that are given according to an order track record of a member and are used in compensation for service selected by the member, for each member.

Specific functions of the point system and the point manager will be explained in detail below.

The lab system 16 includes a PC, a WS, or a server device, and is installed in the lab (photofinisher). A digital photoprinter or a production device such as a device for printing images on various fun goods is connected to or integrated with the lab system 16.

In the lab system 16, order receiving software which is an application for receiving a product order from the network center 12 is installed.

The lab system 16 uses an order receiving module 16a which included in the order receiving software for obtaining an order job from the network center 12 (lab order receiving server) in order to obtain an order information list, and requests transfer of an order job for the lab system 16 to obtain the order job. The lab (lab system 16) creates a product corresponding to the order job, and delivers the product to a delivery destination or a receipt shop according to the order information. The lab system 16 establishes/cancels credit card payment or decides cancellation of debit card payment according to authorization information added to the order information, and sends the result to the settlement site 20.

As described above, the member can use the order entry channel 14 to access the network center 12 (front end) and upload an image to the system album. The member can access the network center in the same manner as above to select an optional image from images stored in the album (album mode) or upload images to select an image therefrom (menu mode), thereby ordering a product. The image that the member has uploaded in the menu mode is stored in the system album.

The nonmember can also access the network center in the same manner from the order entry channel 14 to order a product by a method conforming to the menu mode. An image uploaded by the nonmember is stored in the photo storage as described above.

In the network center 12, order setting information is generated by the commercial product manager in response to an order from the order entry channel 14. Upon establishment of the order, the order manager generates order information and sends an order job (including the order information and its corresponding image data) to the lab order receiving server.

The lab system 16 uses the order receiving module 16a to view a list of order information in the lab order receiving server, requests transfer of an order job for the lab system 16, creates a product such as a print according to the order information of the transferred order job, and delivers the created product.

Thus, according to the network system 10 of the present invention, since the communication network such as the Internet is used, products can be ordered from anywhere regardless of business hours, and digital album services or public album services to a third party can also be provided.

Furthermore, the functions that can be shared by the retailer and the lab are made common, and the interface function for the customer and the management functions of the network system 10 are integrated in the network center 12. Thus, collection and delivery operations, customer management, and settlement processing can be simplified, while achieving simplification of the system operation and reduction of operation costs. In many cases, troubles or version upgrades of the network system 10 can be intensively dealt with in the network center 12, which enables operational stabilization while dealing with troubles more quickly.

Hereinafter, a description is given of a point system and service based on the point system in the network system 10.

As described above, the network system 10 adopts a system for giving points depending on order track records of members. With this system, a member who has accumulated points of a predetermined value or more can be provided with various services depending on the number of the points. The point manager of the back end manages the points.

The point manager (i.e., point management function) manages three kinds of data, namely, data on "total points", data on "remaining points", and data on "ranks" for each member.

The data on "total points" includes a sum value of all the points having been given to a customer so far since the customer was subscribed as a member, and the member having higher total points has better order track record. In other words, the number of total points can be regarded as an order track record of a member so far, i.e., credibility of the member in the image network system. Note that the total points are only increased according to the order track record and are never decreased.

The data on "remaining points" includes the number of points remaining after points which have been used in compensation for a service are deducted from the total points, that is, the number of points currently retained by the member and available to the member. The remaining points increase according to the order track record. In a case where a service is received in compensation for points, the points corresponding to the service are deducted from the remaining points.

The data on "ranks" includes ranks of members, which are determined based on the total points. According to this embodiment, for example, three ranks of A, B, and C are set. Different kinds of services are given to the members depending on the ranks thereof. A member of higher rank (i.e., a member with a larger number of the total points) can naturally receive better services.

When a member orders merchandise such as print by using the order web through the order entry channel 14, points corresponding to the order are added to the total points as well as to the remaining points. When the points are added to the total points, the point manager sets a rank for the member based on the total points of the member. The rank is determined based on whether the number of the total points is larger than a certain threshold value.

As described above, according to the present invention, a rank is determined for each member based on the total points as an index for measuring the credibility of the member. Based on the rank thus determined, each member may be allowed to select a service content for the member, or to change a service content when setting a maximum storage capacity and a storage period of a system album. The selection and change of a service content by a member will be specifically described later.

Figure 2:
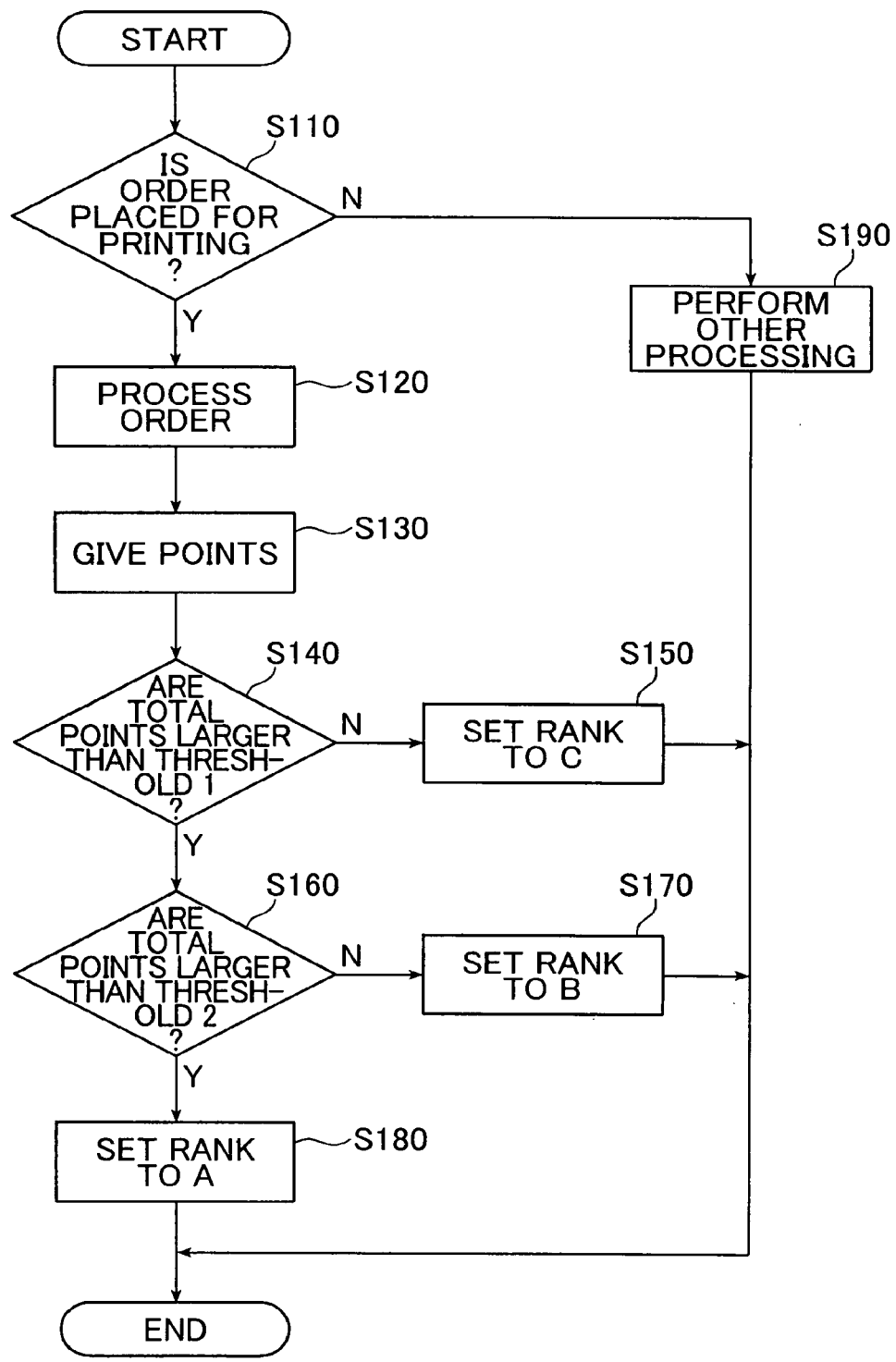
FIG. 2 is a flowchart showing rank judgment processing at a time of order placement in a network center.

Next, explanation will be made of a judgment to be made as to a rank of a member when an order is placed in the network system 10 based on a flowchart of FIG. 2.

In a case where a member places an order for printing or the like by using the order entry channel 14 (S110), the member accesses the order web of the network center 12 as described above to place the order (S120). When the placement of an order has been completed, the point manager determines the number of points to be given to the member in accordance with the content of the order. The number of points to be given may be determined based on the content of the order, or on the value of the order. The content of the order includes merchandise such as print, the order quantity such as the number of prints, a size of the print, and a type of the processing. The points thus determined is added to each of the total points and the remaining points of the member which are managed by the point manager (S130).

Then, the point manager determines the rank of the member after the points are given, with reference to the threshold values 1 and 2 which are provided in advance for rank determination. According to this embodiment, the threshold value 1 is set to be smaller than the threshold value 2 (i.e., the threshold value 1<the threshold value 2). The values of the threshold values 1 and 2 are set in advance by the network center 12.

The point manager first compares the total points, to which points have been added, with the threshold value 1 (S140). When the value of the total points is equal to or smaller than the threshold value 1, the member is set to rank C (S150). Meanwhile, when the value of the total points is larger than the threshold value 1, the value of the total points is further compared with the threshold value 2 (S160). When the value of the total points is larger than the threshold value 2, rank A is set to the member (S180). When the value of the total points is equal to or smaller than the threshold value 2, rank B is set to the member (S170). The rank thus determined is saved in the point manager as in the case of the total points and the remaining points.

When a member who has signed in on the network center 12 through the order entry channel 14 executes processing other than placing an order such as album editing (S190), the rank judgment is not performed.

In the manner as described above, the network center 12 checks the total points of a member each time points corresponding to an order are given to the member, and determines the rank of the member. The rank thus determined is reflected in the control of a screen to be displayed when the member signs in next time.

According to the present invention, the rank is determined immediately after the processing of placing an order. However, the rank may be determined at another timing different from the above. That is, when a member first signs in through the order entry channel 14, the rank may be determined by reading the total points of the member stored in the point manager.

Next, a first embodiment of the image network system using the center server of the present invention will be described in detail.

Figure 3:
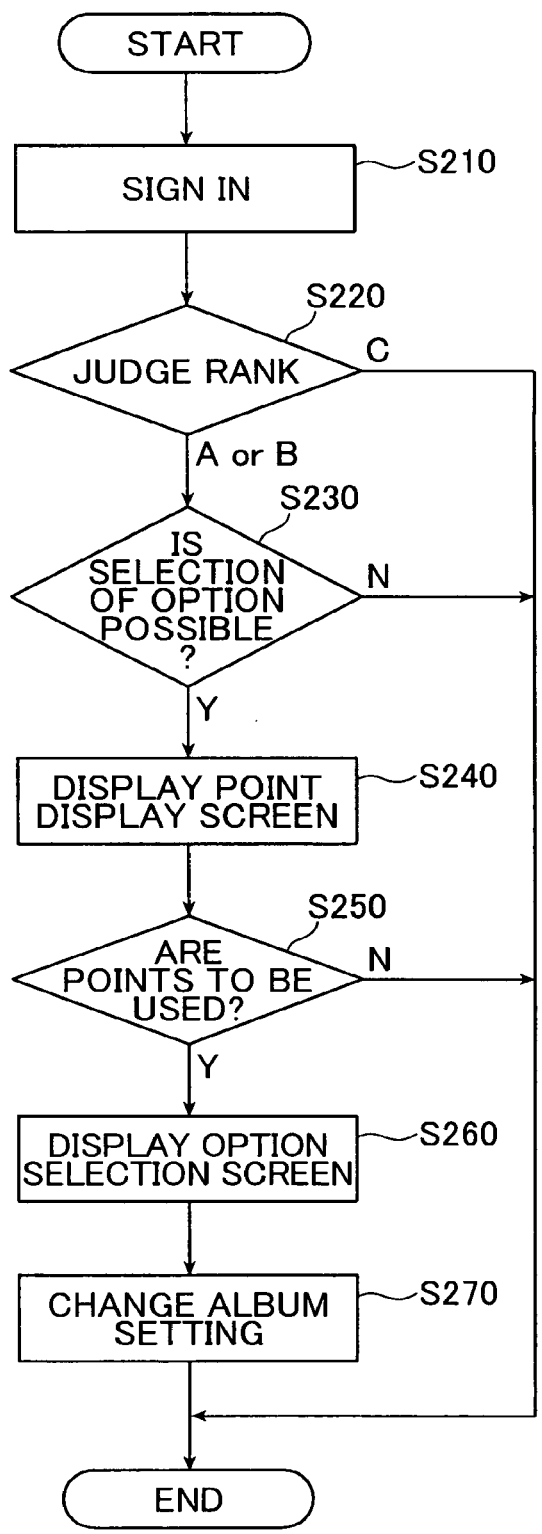
FIG. 3 is a flowchart showing processing for each rank at a time of sign-in in the network center.

First, with reference to the flowchart of FIG. 3, a description is given of the processing to be executed according to the rank of a member when the member signs in on the network center 12.

In FIG. 3, a member connects to the network center 12 through the order entry channel 14 and signs in (S210). When the member signs in, the point manager checks the rank of the member (S220), and the order web causes the order entry channel 14 to display thereon a screen which is different depending upon the rank thus checked.

First, in any of the cases of rank A and rank B, the point manager checks the remaining points of the member to see whether the number of points accumulated as the remaining points is enough (50 points or more in this embodiment) to be used in compensation for optional service described later (S230).

When the number of the remaining points is enough, a point display screen shown in FIG. 4A is displayed. On the point display screen, the remaining points of the member and the choices as to whether to expand the upper limit of the storage capacity of the album or to extend the storage period thereof in exchange for the remaining points, are displayed, and the member is urged to make a choice (S240).

In a case where the member has selected the use of the points (i.e., in a case where "Yes" is selected on the point display screen), the order entry channel 14 displays an option selection screen on which the member selects the optional service (S260). According to this embodiment, the screens as shown in FIGS. 4B and 4C are displayed in the cases of rank B and rank A, respectively, as the option selection screen (S260).

The optional service in this case refers to service that is available to a member of and beyond a certain rank, in exchange for the remaining points. In this embodiment, as an example of the option (i.e., optional service), the storage capacity can be expanded and the storage period can be extended.

In this embodiment, three patterns of the optional service are offered, that is, the expansion of the storage capacity, the extension of the storage period, and the expansion of the storage capacity and storage period.

According to this embodiment, the storage capacity to be expanded and the storage period to be extended are set based on the storage capacity and the storage period calculated by converting and exchanging the remaining points into "retention counts" by the point manager.

One "retention count" corresponds to a case of holding a predetermined amount of data for a predetermined period. That is, the product of a data amount and a period is converted into counts to thereby calculate the capacity and the period. The use of the retention counts described above allows customers to expand, according to their preferences, the capacity and the period under a predetermined condition, thereby making it possible to provide service further finely tuned.

In this embodiment, one retention count (hereinafter, referred to as "one count") corresponds to, for example, a case of storing an image of 1 M byte for a day. Further, 12 counts correspond to one point in the point manager. In the point manager of the network center 12, the number of remaining points of a member is converted into and exchanged for the number of counts, to thereby provide optional service in relation to image management in the album according to the number of the counts, the detail of which is described later.

According to this embodiment, the album setting for each member is initially set such that an image of 50 M bytes at maximum can be stored for 30 days. In other words, the counts corresponding to the setting on the album provided in advance to every member are calculated as follows: 50 M bytes×30 days=1500 counts.

First, in the case where the member is of rank B, it is to provide an optional service of expanding the storage capacity and extending the storage period, in compensation for 50 points of the remaining points of the member. In other words, it is to make the album setting using 2100 counts which is obtained by adding 600 counts (50 points×12) to the initially set 1500 counts.

In the option selection screen shown in FIG. 4B, three choices are displayed on the order entry channel 14 as the optional service choices, which include "expansion of storage capacity by 20 M bytes (50 points needed)", "extension of storage period by 12 days (50 points needed)", and "expansion of storage capacity by 10 M bytes and extension of storage period by 5 days (50 points needed)".

The choice "expansion of storage capacity by 20 M bytes (50 points needed)" is to expand the storage capacity, specifically, to expand the upper limit of the storage capacity by 20 M bytes while the storage period remains unchanged as 30 days. In other words, the album setting of the member is made with the storage capacity of 70 M bytes and the storage period of 30 days.

The choice "extension of storage period by 12 days (50 points needed)" is to extend the storage period, specifically, to extend the storage period by 12 days while the storage capacity remains unchanged as 50 M bytes. In other words, the album setting of the member is made with the storage capacity of 50 M bytes and the storage period of 42 days.

The choice "expansion of storage capacity by 10 M bytes and extension of storage period by 5 days (50 points needed)" is to expand both the storage capacity and the storage period. The storage capacity and the storage period are increased by 10 M bytes and by 5 days, respectively. In other words, the album setting of the member is made with the storage capacity of 60 M bytes and the storage period of 35 days.

In any of those choices, the product of the number of M bytes and the number of days (i.e., 70 M bytes×30 days, 50 M bytes×42 days, or 60 M bytes×35 days) is 2100. In other words, each of those choices results in using 2100 counts which have been obtained by adding 600 counts to the initially set 1500 counts. That is, each of those choices is the optional service using 50 points of the remaining points.

Figure 5A:
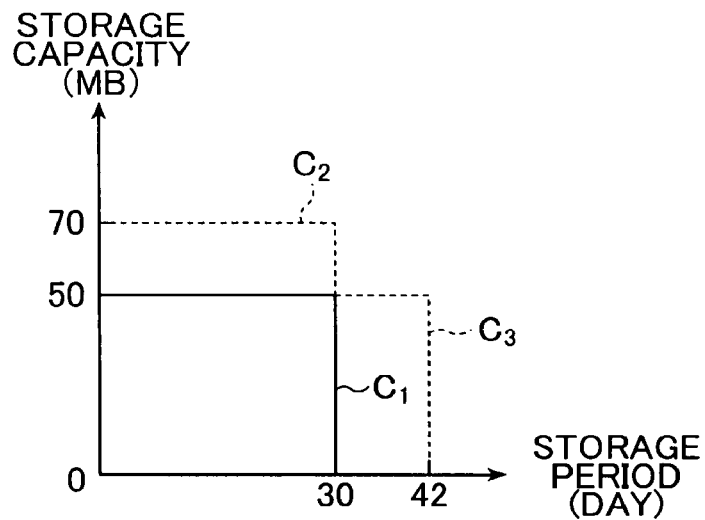
FIG. 5A is a graph showing an example of usage of points at a time of option processing.
Figure 5B:
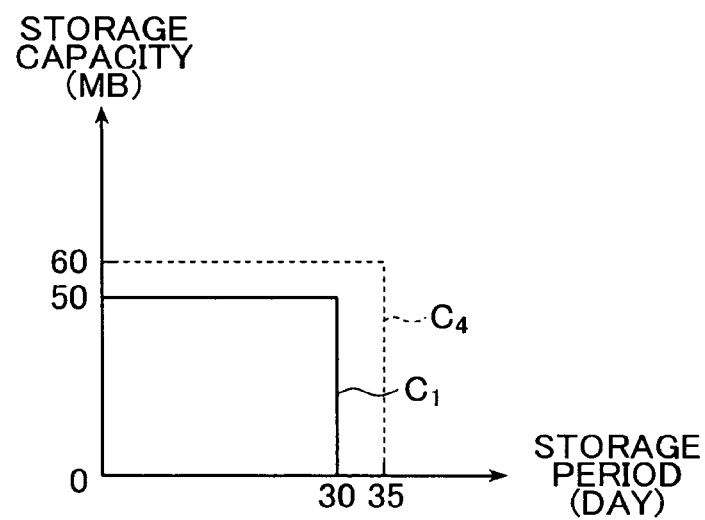
FIG. 5B is a graph showing another example of the usage of points at the time of option processing.

FIGS. 5A and 5B show how the album setting is expanded in compensation for 50 points of the remaining points retained by a member.

In FIGS. 5A and 5B, $C_1$ shows the album setting which has already been provided to a member. The album setting is converted into 1500 counts (50 M bytes×30 days).

When a member selects the "expansion of storage capacity by 20 M bytes (50 points needed)" in the option selection screen shown in FIG. 4B, the album setting is made in which the upper limit of the storage capacity is expanded in compensation for the counts including the 600 counts added as described above. At this time, as indicated by $C_2$ of FIG. 5A, the upper limit of the storage capacity increases by 20 M bytes to be 70 M bytes while the storage period remains unchanged as 30 days. In this case, the number of counts increases by 600 counts (20 M bytes×30 days) as described above when the album setting is changed from $C_1$ to $C_2$.

Alternatively, when a member selects the "extension of storage period by 12 days (50 points needed)" in the option selection screen shown in FIG. 4B, the album setting is made in which the storage period is extended in compensation for the counts including the 600 counts added as described above. At this time, as indicated by $C_3$ of FIG. 5A, the upper limit of the storage capacity remains unchanged as 50 M bytes while the storage period is extended by 12 days to be 42 days. In this case, the number of counts increases by 600 counts (50 M bytes×12 days) as described above when the album setting is changed from $C_1$ to $C_3$.

Further, when a member selects the "expansion of storage capacity by 10 M bytes and extension of storage period by 5 days (50 points needed)" in the option selection screen shown in FIG. 4B, the album setting is made in which the storage capacity is expanded and the storage period is extended in compensation for the counts including the 600 counts added as described above. At this time, as indicated by $C_4$ of FIG. 5B, the upper limit of the storage capacity increases by 10 M bytes to be 60 M bytes while the storage period is extended by 5 days to be 35 days. In this case, the number of counts in the album setting of $C_1$ is 1500 counts (50 M bytes×30 days) and the number of counts in the album setting of $C_4$ is 2100 counts (60 M bytes×35 days). Accordingly, the number of counts increases by 600 counts (2100−1500=600 counts) as described above when the album setting is changed from $C_1$ to $C_4$.

Hereinafter, a description is given of the processing executed by the network center 12 in each case of the choices selected by a member, with reference to the flowchart of FIG. 6.

When a member selects "Yes" in the point display screen shown in FIG. 4A (S310), the order entry channel 14 displays the option selection screen for allowing the member to select the optional service as described above.

When the "expansion of storage capacity" is selected in the option selection screen ("Yes" in S320), the album manager expands the upper limit of the storage capacity of the album of the member by 20 M bytes (S330), the point manager further subtracts 50 points from the remaining points of the member (S340), and the order entry channel 14 displays the result of the storage capacity thus expanded (S350).

When the "extension of storage period" is selected in the option selection screen ("No" in S320, and further "Yes" in S360), the album manager extends the storage period of the album of the member by 12 days (S370), the point manager further subtracts 50 points from the remaining points of the member (S380), and the order entry channel 14 displays the result of the storage period thus extended (S390).

When the "expansion of storage capacity and extension of storage period" is selected in the option selection screen ("No" in S360), the album manager expands the upper limit of the storage capacity by 10 M bytes and extends the storage period by 5 days as to the album of the member (S400), the point manager further subtracts 50 points from the remaining points of the member (S410), and the order entry channel 14 displays the result of the storage capacity thus expanded and the storage period thus extended (S420).

Meanwhile, in the case where the member is of rank A, in addition to the service of rank B, additional optional service of expanding the storage capacity and extending the storage period is provided. The additional optional service needs a further increased number of points, i.e., 100 points of the remaining points of the member. In other words, in addition to the three choices each using 50 points as presented in the case of rank B, additional three choices are further provided each of which results in using 2700 counts obtained by adding 1200 counts (100 points×12=1200 counts) to the initially set 1500 counts, to thereby provide six choices in total.

Figure 7:
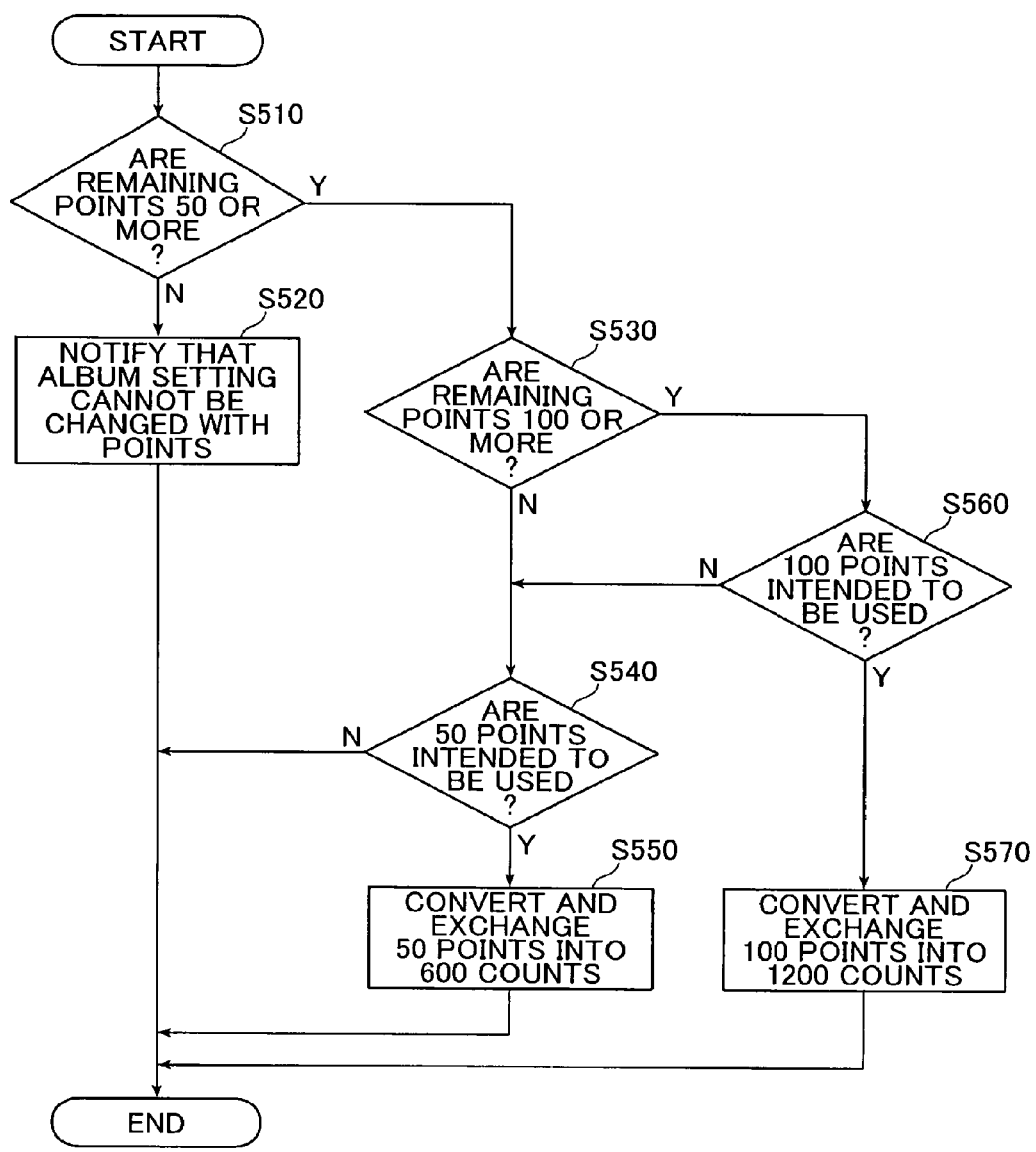
FIG. 7 is a flowchart showing conversion and exchange processing into counts in accordance with remaining points in the network center.

Hereinafter, a description is given of the processing of converting and exchanging the points into the retention counts in the case of rank A, with reference to the flowchart of FIG. 7.

As described above, when a member signs in, the point manager checks the rank of the member. In the case of rank A, the point manager checks the remaining points of the member to see whether the remaining points have been accumulated to 50 points or more (S510).

In the case where the number of the remaining points is 50 or more ("Yes" in S510), the point manager further checks whether 100 points or more are accumulated as the remaining points (S530).

In the case where the number of the remaining points is less than 100 ("No" in S530), the network center 12 causes the order entry channel 14 to display thereon the option selection screen shown in FIG. 4C so as to urge the member to make a choice. In this case, in order to prohibit the member from selecting the choices each using 100 points, selection buttons for the choices may not be displayed. Alternatively, a screen in which the choices each using 100 points are eliminated may be displayed.

In the case where the choice using 50 points of the remaining points is selected in the option selection screen ("Yes" in S540), the 50 points are converted into counts (12×50 points=600 counts), and further, 50 points are subtracted from the remaining points of the member, so that the points are exchanged for counts (S550).

In the case where the selection is canceled ("No" in S540), the remaining points are not converted into and exchanged for counts, and an initial screen or the like is displayed on the order entry channel 14.

In the case where the number of the remaining points is 100 or more ("Yes" in S530), the network center 12 causes the order entry channel 14 to display thereon the option selection screen shown in FIG. 4C so as to urge the member to make a choice.

In the case where the choice using 100 points of the remaining points is selected in the option selection screen ("Yes" in S560), the 100 points are converted into counts (12×100 points=1200 counts), and further, 100 points are subtracted from the remaining points of the member, so that the points are exchanged for counts (S570).

Meanwhile, in the case where the choice using 50 points of the remaining points is selected in the option selection screen ("No" in S560, and further "Yes" in S540), the 50 points are converted into counts (12×50 points=600 counts), and further, 50 points are subtracted from the remaining points of the member, so that the points are exchanged for counts (S550).

In the case where the selection is canceled ("No" in S540), the remaining points are not converted into and exchanged for counts, and an initial screen or the like is displayed on the order entry channel 14.

In the case where the number of the remaining points is less than 50 ("No" in S510), the member is notified, through the order entry channel 14, of the fact that the change of the album setting with the use of points cannot be made (S520).

In the option selection screen shown in FIG. 4C, six choices are displayed on the order entry channel 14 as the optional service choices, which include "expansion of storage capacity by 20 M bytes (50 points needed)", "expansion of storage capacity by 40 M bytes (100 points needed)", "extension of storage period by 12 days (50 points needed)", "extension of storage period by 24 days (100 points needed)", "expansion of storage capacity by 10 M bytes and extension of storage period by 5 days (50 points needed)", and "expansion of storage capacity by 25 M bytes and extension of storage period by 6 days (100 points needed)". Of those choices, the choices each using 50 points are similar to those of the case of rank B described above.

The choice "expansion of storage capacity by 40 M bytes (100 points needed)" is to expand the storage capacity, specifically, to expand the upper limit of the storage capacity by 40 M bytes while the storage period remains unchanged as 30 days. In other words, the album setting of the member is made with the storage capacity of 90 M bytes and the storage period of 30 days.

The choice "extension of storage period by 24 days (100 points needed)" is to extend the storage period, specifically, to extend the storage period by 24 days while the storage capacity remains unchanged as 50 M bytes. In other words, the album setting of the member is made with the storage capacity of 50 M bytes and the storage period of 54 days.

The choice "expansion of storage capacity by 25 M bytes and extension of storage period by 6 days (100 points needed)" is to expand and extend the storage capacity and the storage period, respectively. The storage capacity and the storage period are increased by 25 M bytes and by 6 days, respectively. In other words, the album setting of the member is made with the storage capacity of 75 M bytes and the storage capacity of 36 days.

In any of those choices, the product of the number of M bytes and the number of days (i.e., 90 M bytes×30 days, 50 M bytes×54 days, or 75 M bytes×36 days) is 2700. In other words, each of those choices results in using 2700 counts which have been obtained by adding 1200 counts to the initially set 1500 counts. That is, each of those choices is the optional service using 100 points of the remaining points.

Figure 6:
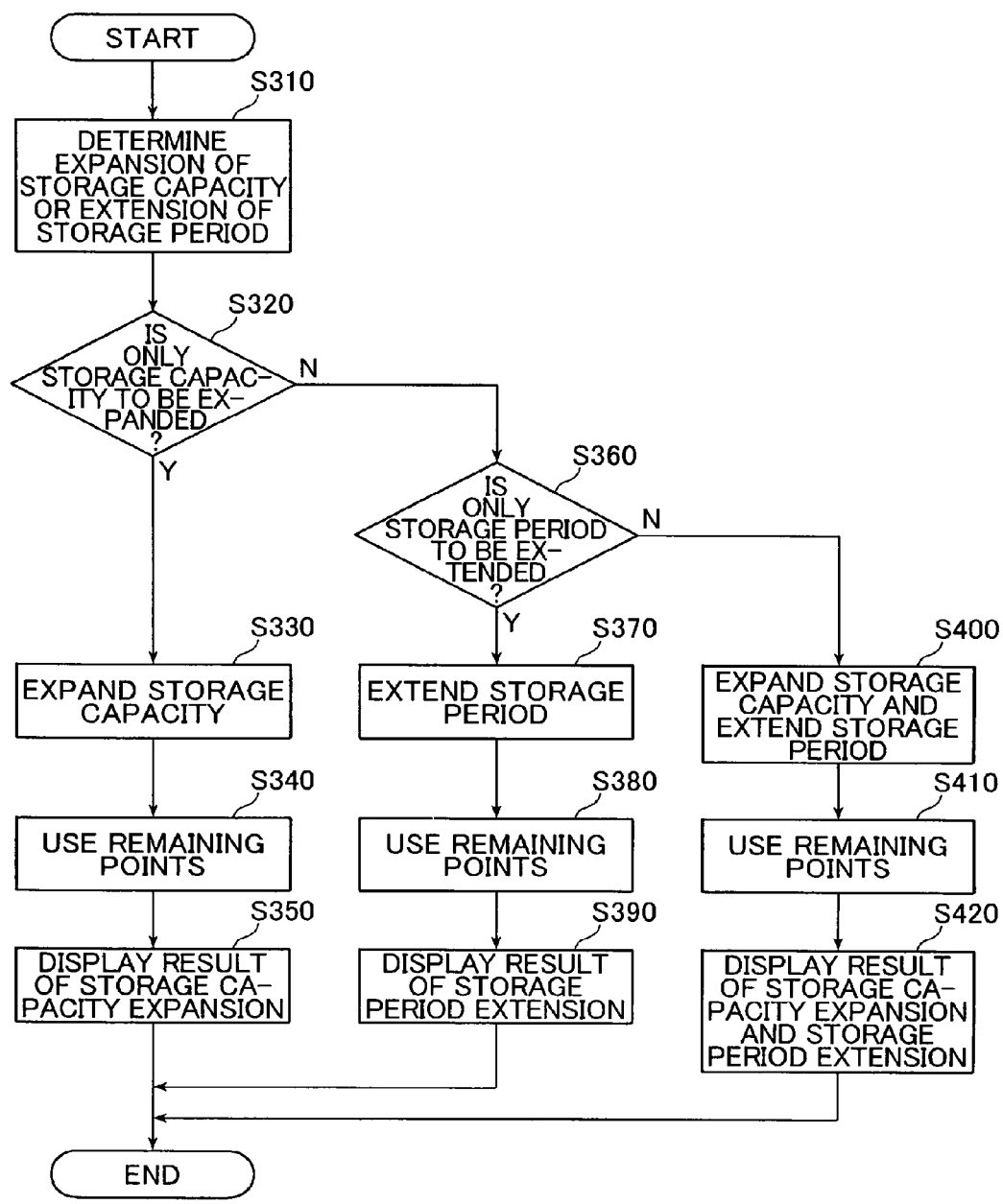
FIG. 6 is a flowchart showing processing for each choice in the option processing at the network center.

When a member selects one of those choices, the processing shown in FIG. 6 is executed as in the case of rank B. In the case of rank A, the expansion processing and the extension processing in Steps S330, S379, and S400, and the use of the points in Steps S340, S380, and S410 depend on the choice selected by the member and the remaining points of the member.

The member selects the desired optional service according to the remaining points. When one of the options is selected, the album manager changes the storage capacity or the storage period of the album of the corresponding member, and further the point manager deducts the corresponding number of points from the remaining points, according to the option thus selected (S270). In this case, points are not subtracted from the total points as described above.

In the example shown in FIG. 4C, the choices each corresponding to either one of 50 points and 100 points are displayed in the case of rank A. However, the present invention is not limited to this, and only the choices each using 100 points may be displayed in the case of rank A.

In the above-mentioned example, a member selects the desired choice from among the choices displayed on the order entry channel 14. According to this embodiment, however, the choices are set based on the number of counts calculated, and therefore, in the case of changing both the storage capacity and the storage period, the storage capacity and the storage period may be arbitrarily set according to the number of counts.

For example, a member may directly input the number of days to extend and the storage capacity to expand, and the point manager may calculate, according to the remaining points of the member, the storage period and the storage capacity corresponding to the remaining points, to thereby set the storage capacity and the storage period.

When the network center 12 completes the change of the album setting and the calculation of the remaining point, an initial screen such as a menu screen is displayed on the order entry channel 14 for allowing the member to start executing an album editing processing or an order placing processing through the screen.

In the case where the number of the remaining points is not enough in Step S230, or where a member has selected "No" in Step S250, the network center 12 causes the order entry channel 14 not to display the point display screen and the option selection screen. When the member signs in, the network center 12 causes the order entry channel 12 to display the initial screen such as a menu screen through which the member executes an album editing processing, an order placing processing, or the like.

In the case of a member of rank C, the network center 12 causes the order entry channel 14 not to display the option selection screen, unlike in the cases of rank A and rank B, regardless of the number of the remaining points. When the member signs in, the network center 12 causes the order entry channel 14 to display thereon the initial screen such as a menu screen through which the member executes an album editing processing, an order placing processing, or the like.

According to the processing as described above, rank C is set to a member who has just subscribed for the membership for the first time and to a member who hardly has an order track record, and therefore the choices to be selected are not displayed on the order entry channel 14 when the member signs in. A member of rank B, who has an order track record equal to or higher than a predetermined value, is provided with better service as compared with a member of rank C. A member of rank A, who has an order track record further higher in amount as compared with a member of rank B, is provided with service further better than the service to be provided to the member of rank B.

In other words, according to the first embodiment, the rank of a member is determined based on the total points, and the optional service is provided to the member when the member signs in, according to the rank thus determined. Accordingly, better service can be provided to a member who has a better order track record, depending on the order track records of the members.

The retention counts are used for setting the amount of the storage capacity to be expanded and the amount of the storage period to be extended, which allows the remaining points to be used for both the expansion of the storage capacity and the extension of the storage period, and the balance between the expansion of the storage capacity and the extension of the storage period can be set based on the preference of the member.

According to this embodiment, the members are ranked on a scale of A to C. However, the members may be ranked in two stages, or may be ranked minutely into four or more stages.

According to this embodiment, three patterns of choices, namely, expansion of storage capacity, extension of storage period, and expansion of storage capacity and extension of storage period, are displayed as optional service. However, the present invention is not limited to this, and the choices of the optional service may include only one or two of the above-mentioned three patterns.

In the above-mentioned embodiment, a description is given of the case where a member who has accumulated points voluntarily desires to change the settings of the album at the time of sign-in. However, the present invention is not limited to this, and the basic storage condition of an image to be provided to a member may be changed (i.e., expanded) when the rank of the member is raised. In this case as well, it is preferable to use the above-mentioned retention counts. That is, the number of counts as to an album is automatically increased with respect to the member upgraded in rank, the storage capacity to be expanded and the storage period to be extended are calculated, and the album is expanded according thereto. In this manner, as in the case of the optional service described above, the storage capacity and the storage period may be expanded according to the preferences of customers, by using the retention counts, thereby making it possible to provide service further finely tuned.

Figure 8:
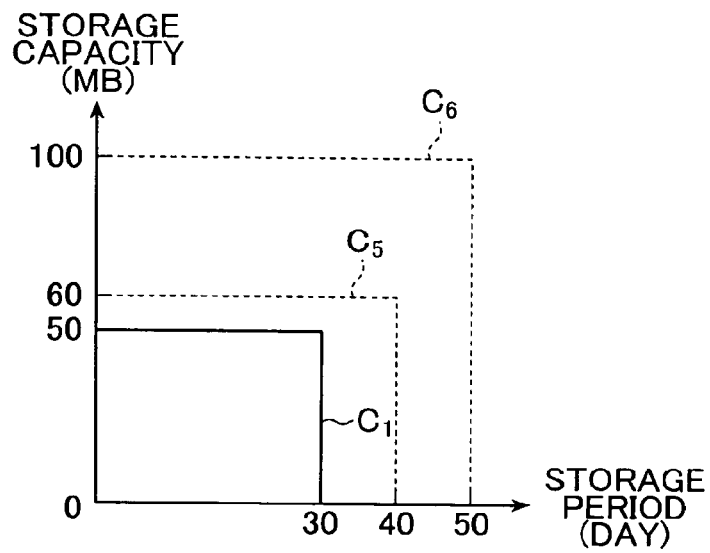
FIG. 8 is a graph showing an example of usage of counts at a time a rank of a member is raised.

FIG. 8 shows how the album setting is expanded due to an increase in the number of counts when the rank of a member is raised.

In FIG. 8, $C_1$ shows the album setting which has already been provided to the member. The album setting is converted into 1500 counts (50 M bytes×30 days=1500 counts).

Hereinafter, a description is given of a case where a member of rank C is upgraded in rank to rank B based on the total points accumulated in accordance with the number of orders which have been placed. When the rank of the member is raised, the album manager adds, for example, 900 counts to the album, to thereby increase the number of the counts from 1500 counts to 2400 counts. Then, the storage capacity and the storage period corresponding to the number of the counts are calculated, and the album is expanded according to the number of the counts thus increased. For example, as shown by $C_5$ of FIG. 8, the upper limit of the storage capacity is expanded by 10 M bytes, and further the storage period is extended by 10 days. In this case, the product of the number of M bytes and the number of days is 2400 (60 M bytes×40 days), that is, the album setting corresponds to 2400 counts.

Further, a description is given of a case where a member of rank B is upgraded in rank to rank A based on the total points accumulated in accordance with the number of orders which have been placed. As an example, the album is set such that a capacity of 60 M bytes is to be stored for 40 days at a time just before the member is upgraded in rank. That is, the album setting is converted into 2400 counts (60 M bytes×40 days=2400 counts).

In this case, the album manager adds, for example, 2600 counts to the album, to thereby increase the number of the counts from 2400 counts to 5000 counts. Then, the storage capacity and the storage period corresponding to the number of the counts are calculated, and the album is expanded according to the number of the counts thus increased. For example, as shown by $C_6$ of FIG. 8, the upper limit of the storage capacity is expanded by 40 M bytes, and further the storage period is extended by 10 days. At this time, the product of the number of M bytes and the number of days is 5000 (100 M bytes×50 days), that is, the album setting corresponds to 5000 counts.

As described above, every time the rank of a member is raised, the storage capacity and the storage period are extended and expanded in stages, respectively, thereby making it possible to provide a highly credible member with much better service increased in convenience.

In the above-mentioned example, when the rank of a member is raised, the album manager automatically expands the album setting by expanding the capacity and the storage period by a predetermined amount. However, the present invention is not limited to this. For example, the order entry channel 14 may display choices for conditions of album setting so as to urge a member to select a condition, and the album setting is expanded based on the condition thus selected.

This case is described as follows.

First, a description is given of a case where the rank of a member is raised from C to B.

As described above, no point has been accumulated as the total point when a member newly registers for membership, and rank C is assigned to the member. The storage capacity and the storage period of the album are initially set to 50 M bytes and 30 days, respectively. In other words, the album setting corresponds to 1500 counts.

Figure 9A:
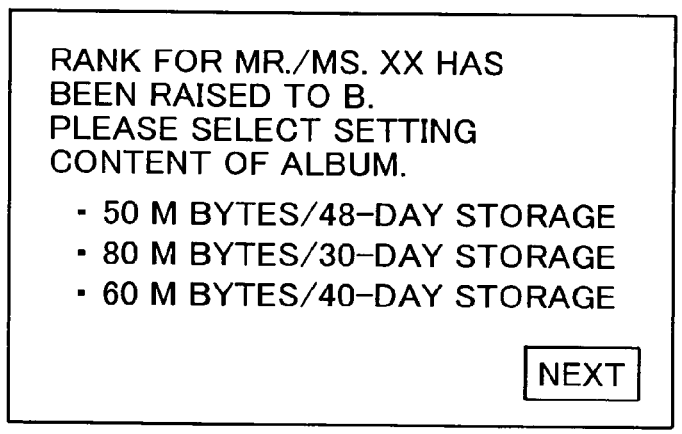
FIG. 9A is a diagram showing an example of a screen which is displayed on the order entry channel at the time the rank of the member is raised.

In this case, when the member is upgraded in rank to rank B based on the total points accumulated in accordance with the number of orders which have been placed, the album manager presents service which corresponds to the increase of the number of the counts of the album from 1500 counts to 2400 counts. That is, the album manager causes the order entry channel 14 to display thereon choices as shown in FIG. 9A for expanding the storage capacity and extending the storage period such that the storage capacity and the storage period of the album collectively correspond to 2400 counts, and urges the member to make a choice.

The choices for the album setting include, for example, "50 M bytes/48-day storage" (i.e., only the storage period is extended by 18 days from the initial setting), "80 M bytes/30-day storage" (i.e., only the storage capacity is expanded by 30 M bytes from the initial setting), and "60 M bytes/40-day storage" (i.e., the storage capacity is expanded by 10 M bytes and the storage period is extended by 10 days, from the initial setting). In any of those choices, the product of the number of M bytes and the number of days (50 M bytes×48 days, 80 M bytes×30 days, or 60 M bytes×40 days) is 2400. In other words, the album setting corresponds to 2400 counts.

The member selects one of the choices corresponding to the desired album setting. When the album setting is selected, the album manager changes the storage capacity and/or the storage period of the album corresponding to the member based on the setting thus selected.

A description is further given of a case where the rank of the member is raised from C to A or from B to A.

Figure 9B:
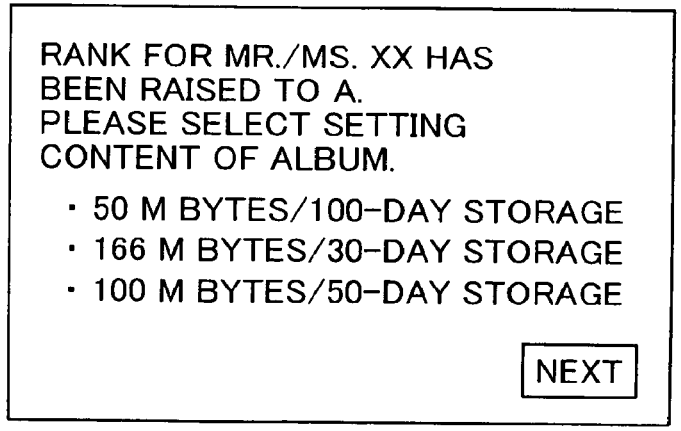
FIG. 9B is a diagram showing another example of the screen which is displayed on the order entry channel at the time the rank of the member is raised.

When the member is upgraded in rank to rank A based on the total points accumulated in accordance with the number of orders which have been placed, the album manager presents optional service of increasing the number of the counts of the album to 5000 counts. That is, the album manager causes the order entry channel 14 to display thereon choices as shown in FIG. 9B for expanding the storage capacity and the storage period such that the storage capacity and the storage period of the album collectively corresponds to 5000 counts, and urges the member to make a choice.

The choices for the album setting include, for example, "50 M bytes/100-day storage" (i.e., only the storage period is extended by 70 days from the initial setting), "166 M bytes/ 30-day storage" (i.e., only the storage capacity is expanded by 116 M bytes from the initial setting), and "100 M bytes/50-day storage" (i.e., the storage capacity is expanded by 50 M bytes and the storage period is extended by 20 days, from the initial setting). In any of those choices, the product of the number of M bytes and the number of days (i.e., 50 M bytes× 100 days, 166 M bytes×30 days, or 100 M bytes×50 days) is 5000. In other words, the album setting corresponds to 5000 counts.

When the member selects one of the choices corresponding to the desired album setting, the album manager changes the storage capacity and/or the storage period of the album of the corresponding member based on the settings thus selected.

It may also be possible to predetermine such courses as a course of extending only the storage period, a course of expanding only the storage capacity, and a course of expanding the storage capacity and extending the storage period, based on the selection made by a member in creating an album or the like. When the rank of the member is raised, the album manager may automatically expand the album settings depending on the predetermined courses. The album manager merely extends the storage period according to the course of extending only the storage period, merely expands the storage capacity according to the course of expanding the storage capacity, and expands the storage capacity and the storage period according to the course of expanding the storage capacity and the storage period.

Even in this case, the choices are set based on the number of the counts calculated. Accordingly, in a case of changing both of the storage capacity and the storage period, a member may directly input the days to extend and the storage capacity to expand, and the point manager calculates the storage period or the storage capacity corresponding to the remaining points based on the remaining points of the member, thereby making it possible to arbitrarily set the storage capacity and the storage period according to the number of the counts.

Further, optional service may be provided for each rank as a bail-out measure for dealing with a capacity shortage of an album resulting from uploading of a new image by a member onto the network center 12.

Figure 10:
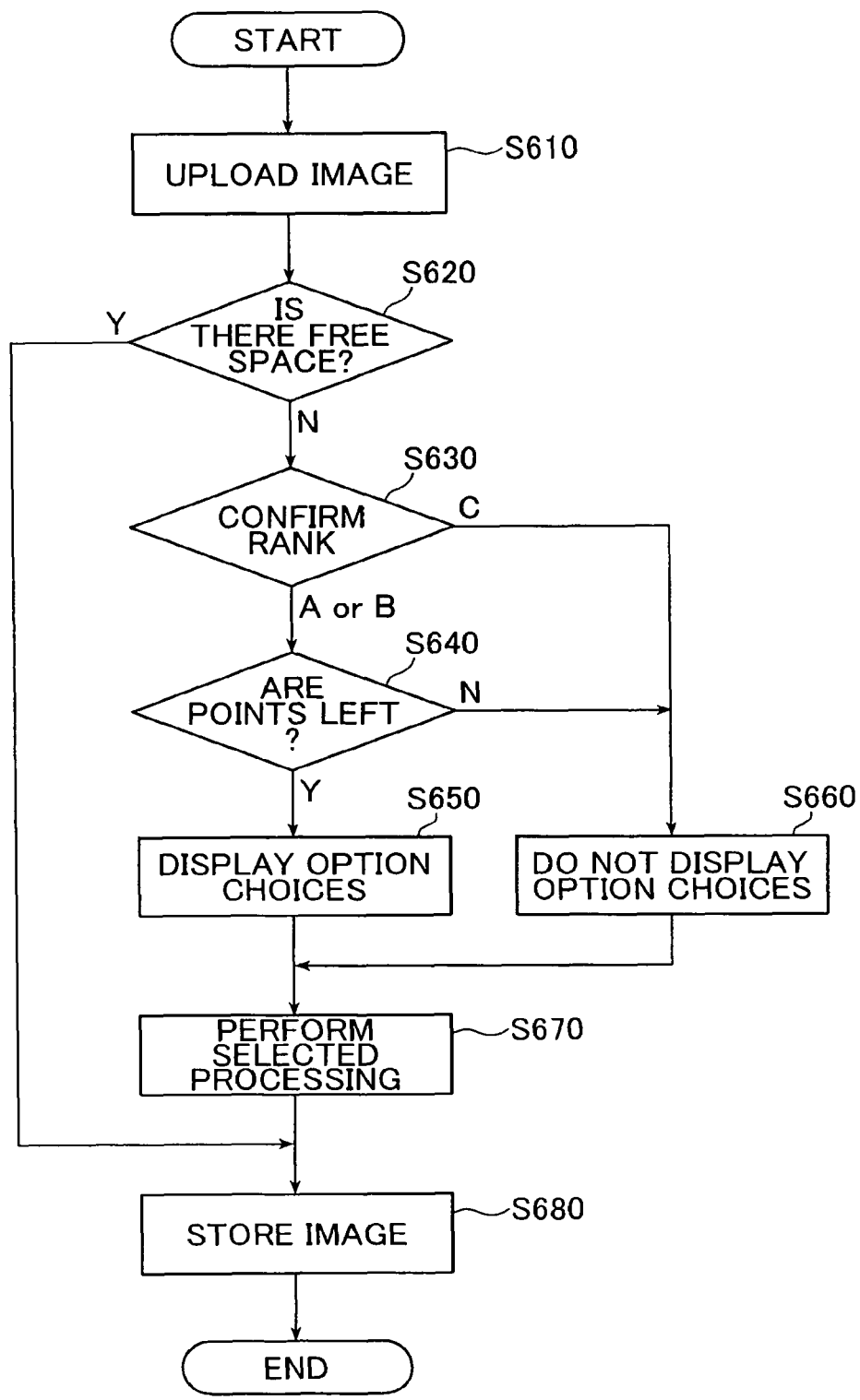
FIG. 10 is a flowchart showing processing for each rank at a time of uploading an image in the network center.

FIG. 10 shows a flow of processing to be executed for each rank in the case where the uploading of image data results in a capacity shortage.

When the member uploads an image onto the network center 12 by using the order entry channel 14 and the image is temporarily stored in the network center 12 (S610), the network center 12 which has received the image checks a free space currently available in the album of the member and the data size of the image uploaded and temporarily stored, in order to see whether the image data to be stored in the album exceeds a specified capacity of the album or not when the image data is stored (S620). When the image data to be stored in the album does not exceed the capacity of the album ("Yes" in S620), the network center 12 stores the image temporarily stored (S680). In S610, the member may transmit merely the information on the data size of the image to be uploaded, instead of actually uploading the image, to the network center 12.

Meanwhile, in the case where the data size of the image thus uploaded is larger than the free space of the album ("No" in S620), the image data to be stored in the album exceeds the capacity of the album, and therefore some kind of a countermeasure must be taken.

In this case, according to this embodiment, when the image data to be stored in the album exceeds the capacity of the album, the network center 12 checks the rank of the member, and presents different choices depending on the ranks, to thereby provide further better service according to the order track record of the member.

In Step S630, the network center 12 checks the rank of the member. In the case where the member is of rank A or B, the point manager checks whether the number of the remaining points of the member is enough (50 points in this example) to execute any one of choices of options described later (S640).

Figure 11:
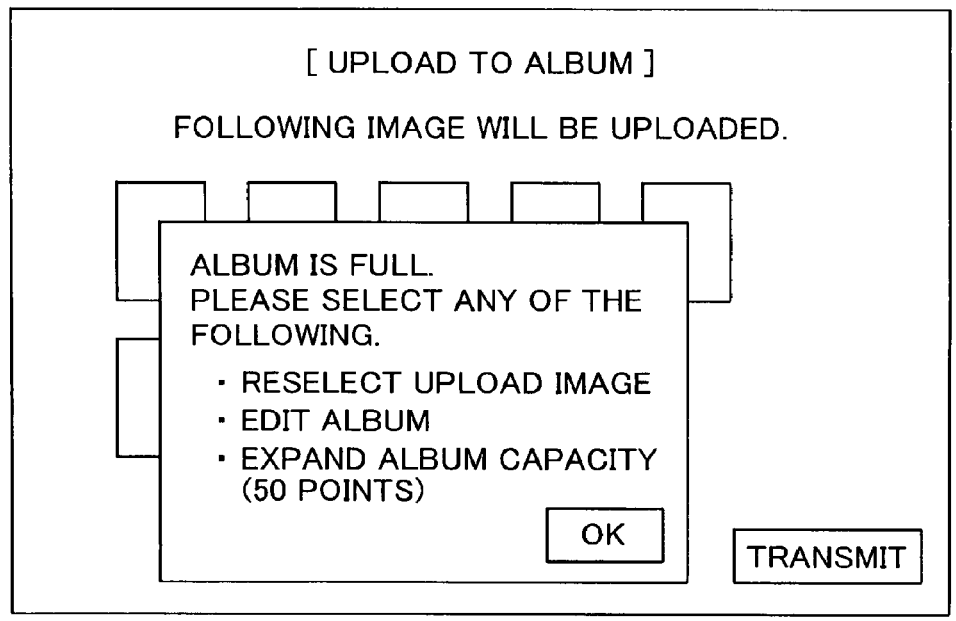
FIG. 11 is a diagram showing an example of a screen which is displayed on the order entry channel at the time of uploading an image.

In the case where the rank of the member is A or B and enough points are remaining ("Yes" in S640), the network center 12 causes the order entry channel 14 to display thereon a screen shown in FIG. 11. In this embodiment, as shown in FIG. 11, three kinds of choices are displayed as a measure to deal with the case where the image data to be stored in the album exceeds the album capacity. As shown in FIG. 11, the three choices include "reselect upload image" and "edit album", and further include "expand album capacity (50 points)", which is displayed only to a member of rank A or B, as a choice of an option (S650).

When the choice "reselect upload image" is selected, the member selects images again. In this case, the member may select images again so as not to exceed the free space of the album.

When the choice "edit album" is selected, the member checks images which have already been uploaded in the album, and deletes, from the album, images on which an order has already been placed or images which need not to be stored anymore, to thereby secure a free space in the album necessary for uploading the new image.

When the choice "expand album capacity (50 points)" is selected, the album manager changes the upper limit of the album capacity of the member so as to be increased by a certain amount (for example, 20 M bytes). Further, the album manager subtracts points (50 points in this example) corresponding to the amount of the album capacity thus increased from the remaining points in the point manager. In this manner, the member is allowed to upload images originally intended to be uploaded, without the need for selecting images again or for deleting any image in the album.

In the manner as described above, the network center 12 executes the processing selected by a member so as to secure a sufficient free space (S670), to thereby store the image (S680).

Meanwhile, in the case of a member of rank C in Step 630, or in the case where the remaining points are not enough to execute the choice of an option ("No" in S640), the network center 12 causes the order entry channel 14 to display thereon only two choices, that is, "reselect upload image" and "edit album", without displaying the choice of an option "expand album capacity (50 points)" (S660).

The member selects one of the two choices so as to execute the processing as described above (S670), to thereby secure a sufficient free space in the album, and uploads an image (S680).

In this manner, when an image is uploaded, the choices to be displayed are changed according to the rank of a member. Accordingly, it is possible to provide further better service to a member having a better order track record.

In the example shown in FIG. 10, the same choices are displayed in the cases of a member of rank A and rank B. However, the present invention is not limited to this. In the case of rank A, for example, a choice of an option to additionally provide a capacity of 40 M bytes in compensation for another 100 points may further be provided in addition to the choices shown in FIG. 11, to thereby differentiate the service to be provided to a member of rank A from the service to be provided to a member of rank B.

In the above embodiment, the system album can be expanded by accumulating total points or using remaining points. In addition, in the present invention, the system album may be reduced according to a status of order placement made by a member. Specifically, in the album manager, a service effective period is set as to the use of the system album, so a member who has continuously placed a large number of orders can receive further better service.

The reduction of the system album is performed as follows. That is, the retention counts are calculated based on the storage capacity and the storage period of the system album of a member, and the system album is reset by using counts which are obtained by subtracting a predetermined number of counts from the calculated retention counts, thereby reducing the system album.

The service effective period is the period from the time a member places a new order to the time the system album is reduced.

As one example, explanation will be made of a case where the album manager makes a setting in which the service effective period is 6 months and the system album is reduced by the amount of 100 counts after the service effective period has passed. Further, the member possesses the system album corresponding to 500 counts (50 M bytes×10 days).

When the member places an order through the order entry channel 14, the album manager sets the date on which the order was placed as the start date of the service effective period, and sets the date which is 6 months from the order placed date as the end date.

In the case where the member does not place any order, that is, the total points are not increased, between the start date and the end date of the service effective period, the album manager changes the setting of the system album to the setting using 400 counts obtained by subtracting 100 counts from 500 counts which the member possesses, thereby reducing the system album.

There is no limitation on the pattern of the system album reduction through subtraction of retention counts. The system album may be reduced to 400 counts by reducing only the storage capacity (40 M bytes×10 days), to 400 counts by reducing only the storage period (50 M bytes×8 days), or to about 400 counts by reducing both of the storage capacity and the storage period (44 M bytes×9 days). The album manager may automatically determine the pattern of the system album reduction while considering the status of the images stored in the system album. Alternatively, a member may select the pattern of the system album reduction from choices displayed on the order entry channel 14, or input the pattern of the system album reduction through the order entry channel 14.

On the other hand, in the case where the member places a new order between the start date and the end date of the service effective period, the album manager sets the date of the new order as the start date of the service effective period to thereby reset the service effective period.

Further, preferably, the album manager notifies the member of the end date of the service effective period one to two weeks beforehand through e-mail or the like. Whereby, the member can reset the service effective period by placing a new order, thereby avoiding the reduction of the system album, or the member can increase the free space by deleting unnecessary images from among images stored in the system album, thereby preparing for the reduction of the system album.

Further, in the above embodiment, the total points are accumulated to increase without decreasing, so that the rank of a member does not drop. However, in the present invention, the rank of a member may drop. Specifically, an effective period is set for the total points, and the rank of a member is regularly rejudged, so a member who has continuously placed a large number of orders can receive better service.

The effective period of the total points is set to one year as one example. The start date of the point effective period may be set to a predetermined date determined by the point manager. The number of the total points is zero at the time of the start date.

When a member places an order within one year from the start date, points corresponding to the order are added to the total points to be accumulated. When the point effective period has passed, the point manager judges the rank of the member based on the total points accumulated until the end date of the point effective period, and resets the rank of the member. The judgment of the rank may be made by comparing the total points with the predetermined threshold values similarly to the above mentioned embodiment. Further, the point manager resets the total points accumulated until the end date of the point effective period, sets the day following the end date of the point effective period as a new start date of the point effective period, and accumulates the total points according to orders placed from the newly set start date during the point effective period.

As described above, the rank of a member is rejudged each time a point effective period has passed. Thus, in the case where a member who temporarily placed a large number of orders and was judged to rank A does not place any order after the total points are reset, the rank of the member drops to rank B or rank C. Whereby, a member who has continuously placed a large number of orders can receive better service.

Further, similarly to the total points, an effective period may be set for the remaining points, and the accumulated remaining points may be reset after the effective period has passed. Whereby, a member can effectively utilize a desired service within the effective period by using remaining points given.

In each of the above described embodiments, preferably, orders can be placed not only for images of a member himself/herself but also for images of others.

As described above, a member can create the share box for disclosing the images of the member to others, whereby the member can disclose the images in the share box to others by providing URL for viewing the images to others. A person who viewed the images stored in the share box can place an order such as printing for favorite images thereamong.

At this time, in the case where the person who placed the order is a member of the network system, the total points and the remaining points are added to both of a creator of the share box, i.e., the member who possesses the images ordered, and the member who has placed the order. In the case where the person who placed the order is not a member of the network system, the total points and the remaining points are added only to the member who possesses the images ordered.

In this manner, when the total points and the remaining points are added to the member due to the order placed by others, preferably, the point manager notifies the member who possesses the images ordered of the fact that the points are given through e-mail or the like.

Further, preferably, the counts retained by the member can be converted into and exchanged for points according to the storage conditions of the images, so that the member can use the points for a desired service.

For example, there is considered a case where a member stores a small number of images not for a long period, so the member cannot effectively utilize the storage capacity and the storage period of the system album corresponding to the number of the counts that are given to and retained by the member. In this case, the counts corresponding to the storage capacity and the storage period necessary for storing the images may be secured, the remaining counts may be converted into and exchanged for points, and the member may receive various services using the points. Examples of the services using points include discount of printing charge, and exchange of points for products. Whereby, even a member who stores a small number of images not for a long period can effectively use retention counts given.

In this embodiment, the center server is provided in the network center, however, the present invention is not limited thereto. A part other than the network center, such as the retailer system and the lab system, may include the center server.

As described above, according to the first embodiment, it is possible to provide different kinds of service depending on ranks of a member, thereby making it possible to realize a center server constituting an image network system capable of providing a better service to a member having a good order track record, and an image network system including the center server.

Further, the storage capacity and the storage period for image data can be expanded and extended, respectively, according to the order track record of a member, so that a member is allowed to store more images for a longer period of time, thereby leading to the promotion of network print ordering.

Further, the retention counts are used to set the expansion amounts of the storage capacity and the storage period, which makes it possible to use the remaining points to expand the storage capacity and to extend the storage period. The balance between the storage capacity and the storage period can further be set so as to suit the preference of the member.

Further, in uploading an image, a member with a good order track record can comfortably upload a new image without the need for deleting images or selecting images again in the case of accidental capacity shortage.

Next, a second embodiment of the image network system using the center server of the present invention is described in detail.

In the network system 10 shown in FIG. 1, as described above, for example, in creating a system album or when there is a request made by a member afterward, selection/settings can be made on the maximum storage capacity which is an upper limit of the storage capacity of the system album and also on the storage period for storing images in the system album.

In this case, when each of the choices corresponds to the same number of retention counts, a member can select, in making selection/settings of the storage period, the setting of the system album as desired depending on how the member uses the album, without giving consideration to the gain and loss to be produced according to the choice to be selected. In addition, after selecting the initial setting of the system album, depending upon the storage conditions of the images, a member can appropriately change the storage capacity and the storage period within the range not exceeding the number of the retention counts given.

Further, points given to a member according to the order track record are converted into and exchanged for retention counts, which are used for expanding the settings on the storage period and on the maximum storage capacity. The retention counts are also given to a member according to the credibility of the member, and the retention counts thus given may also be used to provide service of extending the storage period and expanding the maximum storage capacity of the system album. Examples of the above-mentioned service which is provided by using the retention counts include service of extending the storage period and expanding the maximum storage capacity of a system album, and service of providing an extended storage period longer than an ordinary period for a specific image.

According to a second embodiment described below in detail, the above-mentioned services can be realized in the network system 10.

In the second embodiment, similarly to the first embodiment, the storage capacity and the storage period of an album are converted into "retention counts", which are used to set the storage capacity and the storage period for an image. Also, one retention count (hereinafter, referred to as "one count") corresponds to a case of storing an image of 1 M bytes for a day.

According to the second embodiment, the album manager shown in FIG. 1 provides a premium image setting function (i.e., extended storage image selection function block) described later and a count setting function (i.e., count setting function block), in addition to the management function (i.e., storage condition management function) of managing the maximum storage capacity and the storage period of an image in the above-mentioned album, a share box, or a photo storage.

The storage period and the maximum storage capacity are set when a system album is created (i.e., upon member registration), or when a request is made by a member. Further, for a specific image selected by a member as a premium storage image, a storage period different from that of other images is set for the premium storage image. This point is specifically described later.

As described above, the album function of the network center 12 provides a function of storing images in a system album for each member. The system album has basic storage capacity and storage period set in advance, and each member can freely upload images onto the network center 12 to the extent of the maximum storage capacity and the storage period.

The album manager manages the images stored in the album. Also, the album manager manages the settings made as to the maximum storage capacity, the storage period, and the like of the album, by using the retention counts.

In other words, according to the second embodiment, the storage capacity and the storage period are set by providing choices such that each of the choices corresponds to the same number of the retention counts.

The use of the retention counts as described above makes it possible to provide various services regarding an album. For example, a plurality of choices using the same number of retention counts are provided for setting an album, and a member selects a desired setting from among the choices thus provided.

When a customer newly registers for membership to the network center 12 through the order entry channel 14, a system album is automatically created for each member by the album function as described above.

At this time, the album manager causes the order entry channel 14 to display thereon the album setting screen for making an initial setting on the maximum storage capacity and the storage period of the system album.

In the album setting screen, a plurality of courses are displayed as choices so that a member can set the maximum storage capacity and the storage period depending on how the member uses the album. The member is urged to select a desired one of the courses displayed.

An example of the album setting screen may be a screen shown in FIG. 13.

In FIG. 13, the album manager causes the order entry channel 14 to display thereon three choices as the initial settings of a system album when a customer registers for membership. The three choices include: a "capacity-weighted course (50 M/10 days)", a "period-weighted course (10 M bytes/50 days)", and a "premium storage course (5 M/standard 50 days, premium 150 days)".

In this case, according to the "capacity-weighted course", of the functions of the album, the maximum storage capacity is set to be large while the storage period is set to be shorter than that of the "period-weighted course". On the other hand, according to the "period-weighted course", the maximum storage capacity is not so large while the storage period is set to be long, as compared with those of the "capacity-weighted course".

According to the above-mentioned two courses, the same storage period is set to every image stored in the album. However, in the images stored in the album, there may exist images which the member wants to keep for a long period and images which the member does not want to keep for a long period. In view of this, the images are sorted as to whether the image is stored for an ordinary period or the image is stored for a period longer than the ordinary period, to thereby efficiently use the counts of the album. Therefore, according to this embodiment, the "premium storage course" is presented as a third choice.

According to the "premium storage course", the images in an album are sorted into "ordinary image" and "premium storage image (hereinafter, referred to as "premium image")", and the maximum storage capacity of the album is set to be further smaller than that of the "period-weighted course" while a storage period can be set further longer than that of the "period-weighted course" only for a premium image.

The premium image refers to an image that is to be stored for a longer period as compared with an ordinary image. A member who has selected the premium storage course selects from among the images in the album, an image to be stored as the premium image, through the order entry channel 14. The selection may be made when uploading the image, or may be made arbitrarily after the uploading of the image by requesting the order entry channel 14 to display thereon a screen for selecting an image as the premium image. The image thus selected is regarded as the premium image, to which a storage period of 150 days is set. On the other hand, the rest of the images which are not selected by the member are regarded as the ordinary image, to which a storage period of 50 days is set. According to this embodiment, images of up to 2.5 M bytes can be selected as the premium images.

The album setting in the "capacity-weighted course" is converted into 500 counts (50 M bytes×10 days=500 counts). On the other hand, the album setting in the "period-weighted course" is converted into 500 counts (10 M bytes×50 days=500 counts). Further, the album setting in the "premium storage course" is converted into 500 counts, which is obtained by adding 125 counts (2.5 M bytes×50 days=125 counts) of an ordinary image to 375 counts (2.5 M bytes×150 days=375 counts) of the premium image in the case where the images corresponding to a data size of 2.5 M bytes are selected as the premium image.

As described above, according to the above-mentioned three courses, the album setting for each course corresponds to the retention counts of 500 counts. In other words, each of those courses corresponds to the same number of retention counts. Accordingly, a member can select the setting of the album as desired depending on how the member uses the album, without giving consideration to the gain and loss to be produced depending on the course to be selected. Further, in the network center 12, the same load is imposed on a server no matter which of the courses is selected, whereby a member can select any course in a fair manner.

According to the second embodiment of the present invention as described above, for example, a member who wishes to order a large number of images at once may select the "capacity-weighted course". A member who may repeatedly order a small number of images or a member who has uploaded images to the system album but still wishes to order an image after a certain period of time from the uploading may select the "period-weighted course". Further, a member who wishes to order only a specific image after a certain period of time from the uploading may select the "premium storage course". As described above, a member can select a desirable course on the basis of the network system 10 or the use of the image.

Further, as described above, each of those three courses has the album setting corresponding to the retention count of 500 counts. Thus, a member can desirably set the system album according to the member's usage regardless of gain and loss generated by the selection of the course. In addition, in the network center 12, irrespective of the selection of the course, the load to the server is assumed to be the same. As a result, the center server can be stably provided.

In this embodiment, the choices each using the retention counts of 500 counts are presented as the initial setting of the system album, however, the number of the retention counts at the time of the initial setting may be freely set on the retailer system side or the lab system side as long as the choices use the same number of the retention counts.

Further, the course setting of the system album may be changed after the member registration by displaying the album setting screen of FIG. 13. For example, the course setting may be changed in a case where a member presses a predetermined album setting change button or the like to request the album manager to change the setting through the order entry channel 14 during sign-in or browsing of an album.

The member can appropriately change the storage capacity and the storage period within the range not exceeding the number of the retention counts that are given to the member at the initial setting of the system album and are retained by the member.

That is, in this embodiment, the member selects the album setting for the amount of 500 counts among the choices presented in the initial setting of the system album. Thus, the member is given and retains 500 counts as the retention counts that the member can use. Thereafter, the member can freely change the setting of the storage capacity and the storage period of the system album along with the increase or decrease of the data sizes of the images stored in the system album to the extent not to exceed the number of the counts retained.

The setting of the system album needs only be changed depending upon the condition at the time. For example, the setting of the system album is changed in such a manner that when the data sizes of the images stored in the system album are small, the storage capacity is reduced and the storage period is extended for the reduced amount of the storage capacity, or when the data sizes of the images which a member wishes to store are large, the storage period is shortened and the storage capacity is expanded for the shortened amount of the storage period.

For example, the setting of the system album for a member having 500 counts can be changed to any setting other than the above described choices, such as a setting of 5 M bytes×100 days=500 counts or a setting of 100 M bytes×5 days=500 counts.

Not all the counts given are necessarily used for album setting, and the album setting may be changed to any setting such as a setting of 10 M bytes×30 days=300 counts. That is, a member can change the album setting by using necessary counts out of the counts given.

In this manner, a member can appropriately change the setting of the system album depending upon a data amount of images actually stored in the system album.

In the case where counts remain after performing album setting by using the necessary number of counts, a member may convert the remaining counts into points, exchange the counts for the converted points, and receive various services using the points. For example, in the above embodiment, 200 counts (500 counts−300 counts) can be used for receiving service using points. Conversion and exchange of counts into/for points, and service using points will be described in detail later.

As described above, the network system 10 manages the points given to and retained by each member based on the order track record in the point manager. Further, the album manager manages the storage condition of an image based on the retention counts. In the second embodiment, in view of the above-mentioned points, remaining points retained by the member managed in the point manager may be converted into and exchanged for retention counts to be used in the album service. For example, irrespective of the course selected by a member on the album setting screen of FIG. 13, a specific image may be selected as a premium image, and regarding the image management of the album, in the point manager, the remaining points of the member may be converted into and exchanged for retention counts so that the premium image can be stored for a long period of time according to the number of the counts.

In this embodiment, similarly to the first embodiment, one point in the point manager corresponds to 12 counts of the retention count.

In this embodiment, among the images in the album, an image required to be stored for a long period of time is set as a premium image. After the normal storage period, the storage period of the premium image is extended for a predetermined period according to the remaining points of a member and the premium image is stored in the album for the corresponding period.

Similarly to the example described above, in a case where a member presses the button displayed on the order entry channel 14 to prompt the premium image selection screen to be displayed when images are newly uploaded to the album or while the images are stored in the album afterward, the network center 12 causes the order entry channel 14 to display thumbnail images of the album images. Among those images, when a member selects an image to be set for the premium storage, the selected image is set as a premium image in the album function.

Figure 14:
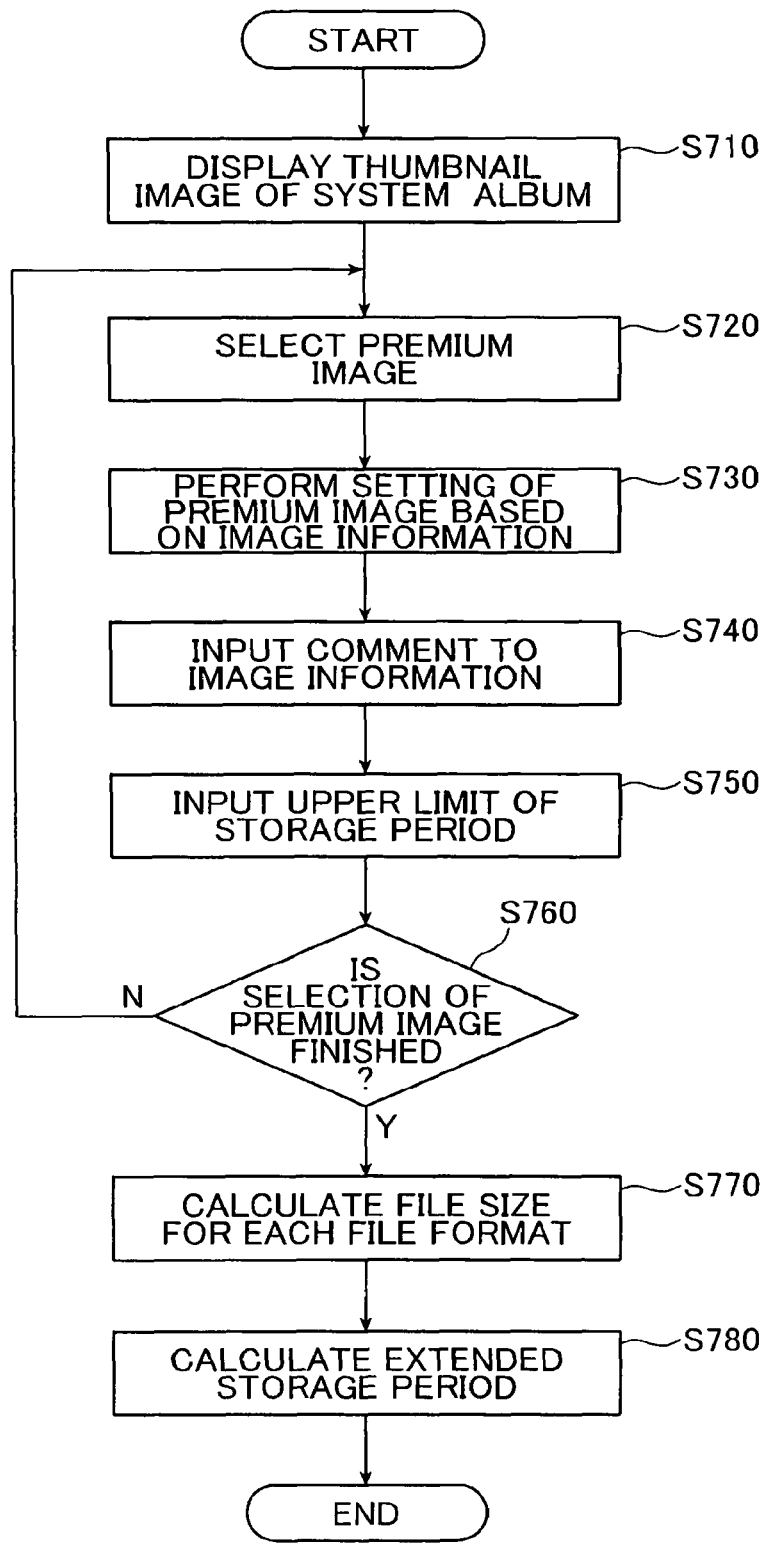
FIG. 14 is a flowchart showing a flow of processing in selecting a premium image.

FIG. 14 is a flowchart illustrating how a premium image is selected. It should be noted that the following description can be adopted in the case of the premium storage course in the above-mentioned album setting screen of FIG. 13 and in the case of a later described extended storage of the premium image using retention counts automatically given to a member when a rank of the member is raised.

In a case where a member presses the button displayed on the order entry channel 14 to prompt the premium image selection screen to be displayed when images are newly uploaded to the album or while the images are stored in the album afterward, the network center 12 causes the order entry channel 14 to display thumbnail images of the album images (S710). When a member selects an image to be set for the premium storage among the displayed images (S720), image information of the selected image recorded in the image information table is updated, and the selected image is set as a premium image (S730).

FIG. 12 is an example of the image information table. The table stores table information concerning each image uploaded by a member.

The image information is managed based on various pieces of information starting from an image code. In the table, a stored file indicates a file in which an uploaded image file is stored. A thumbnail indicates an image file in a case of displaying a list of thumbnail images. A view image file indicates an image file in a case of performing a slideshow. As described above, information is stored in an optimum form according to the intended use. Accordingly, a list can be displayed rapidly and a slideshow can be played smoothly, thereby enhancing operability by a member.

Further, the image information table contains a stored file size and a premium storage flag for each image. In the album function (i.e., capacity management function), "1" is input to the premium storage flag of image information corresponding to the image selected in Step S720. The selected premium image is therefore determined as a premium image.

Subsequently, the network center 12 causes the order entry channel 14 to display a comment input screen regarding the image selected as a premium image, and a member is asked to input a comment (S740). As the comment, characters can be recorded so as to indicate a content of each image, such as "Family trip, summer 2003". A member may input the comment if necessary.

Further, if required, the network center 12 allows a member to set an upper limit of the storage period again within a period set in the album manager (S750). In other words, in this embodiment, the storage period of the premium image is set to 150 days. However, regarding an image which does not need to be stored for the entire period, a member arbitrary sets the storage period again to, for example, 100 days. As a result, it is prevented that the album capacity is unnecessarily occupied by images which do not need to be stored and remaining points of the member are wasted.

Upon completion of Steps S730 to S750, the image is set as a premium image. In a case of continuously selecting another premium image ("No" in Step S760), the procedure returns to Step S720 to select a premium image, and the above-mentioned processing is repeated.

Upon completing the selection of the premium images ("Yes" in Step S760), an image data size regarding the premium images is calculated for each file format in the album manager (S770). This processing is a preparation for the following situation in a case of uploading a new image to the album. That is, in a case where the capacity is overloaded and the upload is prohibited, the file format of the image data stored in the album is converted, and therefore the data size of the image is reduced to secure enough free space.

In other words, according to the processing, in uploading a new image or the like henceforth, in a case where a file format of image data is converted to compensate for the shortage of capacity, a free space that can be secured in the case of converting the format can be calculated rapidly. In addition, by reducing the data size of a premium image as described above, a member can reduce a number of counts and a number of remaining points used to extend storage of a premium image. It should be noted that, regarding the conversion of the file format, conversion from RAW to TIFF is most effective for securing a free space.

Figure 15:
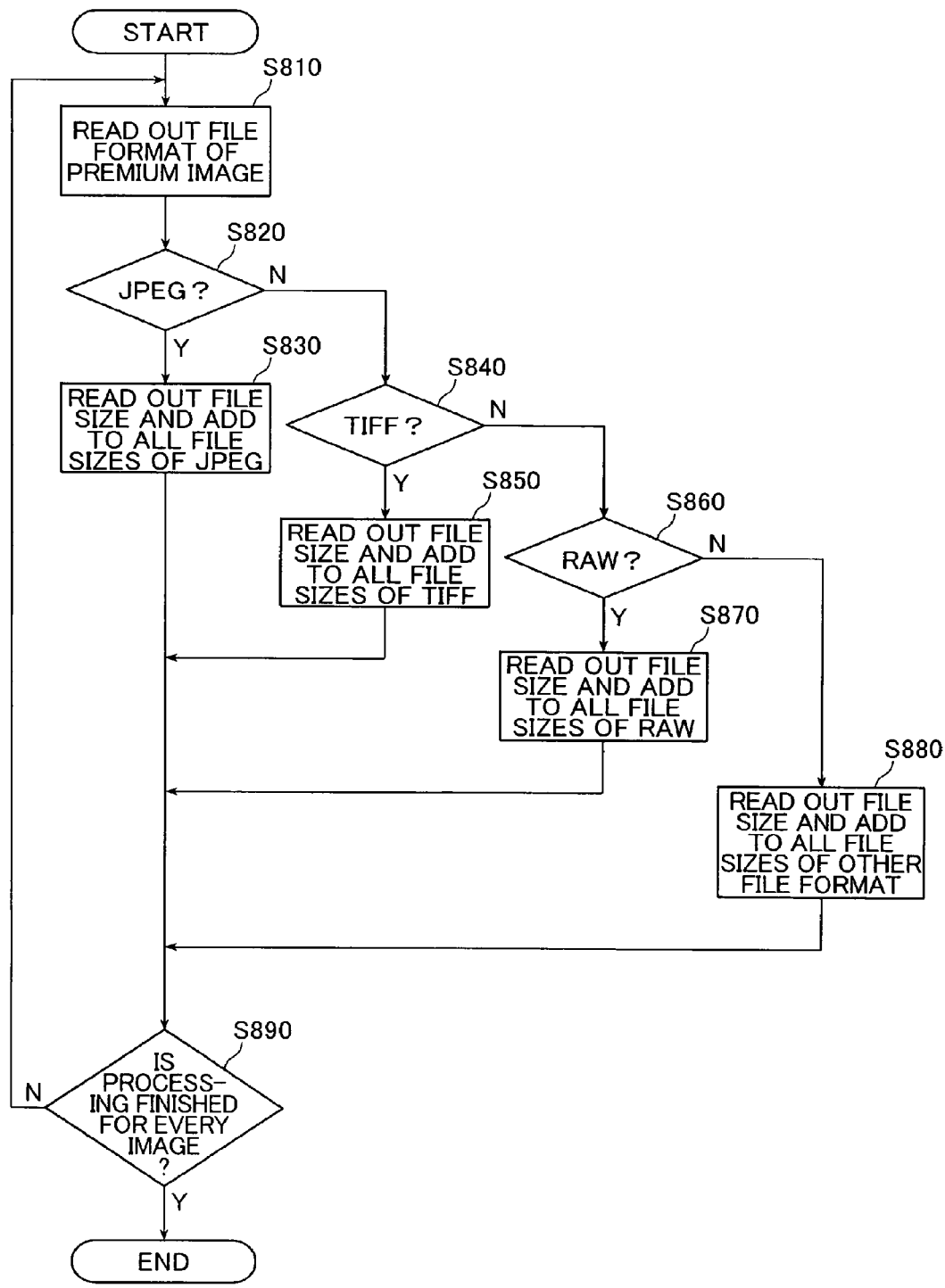
FIG. 15 is a flowchart showing a flow of capacity calculation processing for each image format in selecting the premium image.

Referring to a flowchart of FIG. 15, a file size calculation method of a premium image for each file format is described in detail.

Upon completing the selection of the premium images ("Yes" in Step S760 of FIG. 14), image information of a premium image is retrieved from the image information table, and the file format type thereof is read out (S810) in the album manager.

In a case where the file format type is "JPEG" ("Yes" in Step S820), a stored file size of the premium image is read out from the image information table, and the stored file size is added to obtain a total file size of JPEG data (S830).

Meanwhile, in a case where the file format type is "TIFF" ("No" in Step S820 and "Yes" in Step S840), a stored file size of the premium image is read out from the image information table, and the stored file size is added to obtain a total file size of TIFF data (S850).

Further, in a case where the file format type is "RAW" ("No" in Step S840 and "Yes" in Step S860), a stored file size of the premium image is read out from the image information table, and the stored file size is added to obtain a total file size of RAW data (S870).

In a case where the file format type does not correspond to the above-mentioned three types ("No" in Step S860), a stored file size of the premium image is read out from the image information table, and the stored file size is added to obtain a total capacity of other images (S880).

The processing as described above is repeated for all the premium images (S890).

In the example of FIG. 14, upon completion of the file size calculation for each file format (S770), an extended storage period of a premium image is calculated in the album manager (S780). According to the processing, remaining points of a member and a future consumption amount of the retention counts are estimated based on the extended storage period of a premium image.

Figure 16:
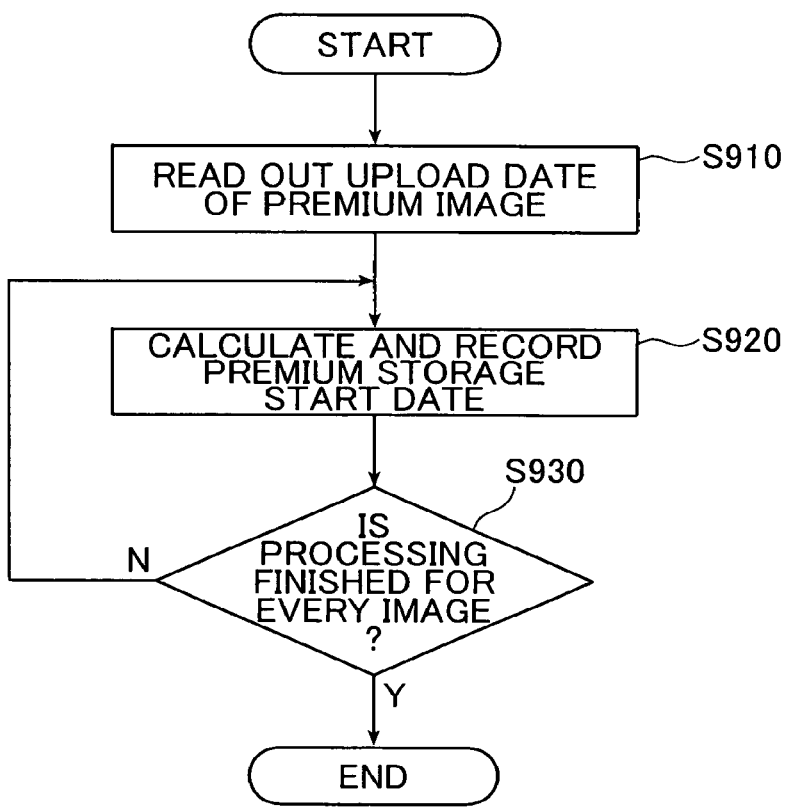
FIG. 16 is a flowchart showing a flow of calculation processing on a first day of premium storage, in selecting the premium image.

Referring to a flowchart of FIG. 16, the method for calculating the extended storage period of a premium image is described in detail.

Upon completion of the file size calculation of a premium image for each file format (S770 of FIG. 14), an upload date is read out from the image information of the premium image stored in the image information table in the album manager (S910).

Subsequently, a premium storage start date is recorded in the image information of the premium image. In this embodiment, the storage period of a normal image is 50 days. Thus, the day 50 days from the upload date, that is, 51st day, corresponds to the start date of the extended storage period of the premium image. The date of the 51st day is stored in the image information table as the premium storage start date (S920).

The processing as described above is repeated for all the premium images (S930).

Accordingly, by reading data out of the image information table, the date on which the extended storage of a premium image is started and a stored file size thereof can be previously calculated. As a result, remaining points to be used by the album and a future consumption amount of the retention counts can be predicted.

Upon completion of the processing up to Step S780 of FIG. 14 as described above, the setting of a premium image with respect to the image selected by the member is completed.

In this embodiment, as an example, it is assumed that, in an album in which the maximum storage capacity of 50 M bytes and the storage period of 30 days are set, images of 30 M bytes are stored in the album, and images corresponding to 20 M bytes out of the images of 30 M bytes are set as premium images.

A premium image is stored in the album as in the case of a normal image for the normal storage period of 30 days, unless the member deletes the premium image. Upon exceeding 30 days, the premium image is further stored for an extended period corresponding to remaining points of the member.

Figure 17A:
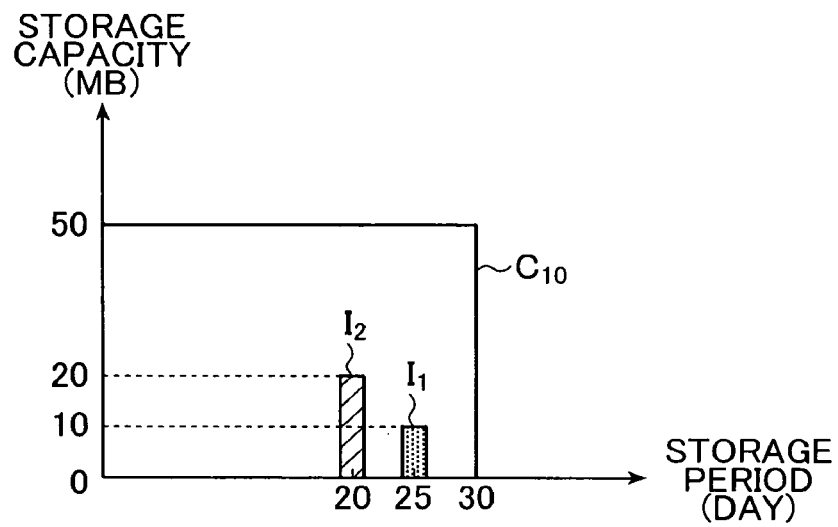
FIG. 17A is a graph showing an example of a state of an album in extending storage of the premium image using remaining points.

It is assumed that, in the album, an image of 10 M bytes is uploaded to the album as a standard image, and an image of 20 M bytes is uploaded as a premium image five days later. FIG. 17A shows a state of the album in a case where 25 days have passed since the standard image of 10 M bytes has been uploaded.

At a time point of FIG. 17A, a standard image $I_1$ and a premium image $I_2$ are within a range ($C_{10}$) of the maximum storage capacity and the storage period. Thus, the standard image $I_1$ and the premium image $I_2$ are stored in the album.

Figure 17B:
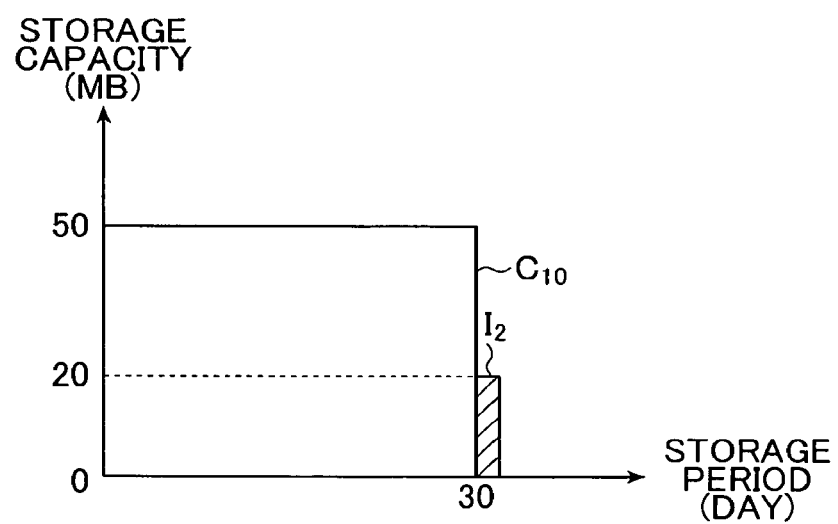
FIG. 17B is a graph showing another example of the state of the album in extending storage of the premium image using the remaining points.

Next, FIG. 17B shows a state of the album in a case where additional 11 days have passed since the time point shown in FIG. 17A. At this time, regarding the standard image $I_1$, the storage period is already expired. Thus, the standard image $I_1$ is deleted from the album. Meanwhile, regarding the premium image $I_2$, the normal storage period is expired 10 days after the time point shown in FIG. 17A, so that the extended storage period based on the remaining points starts from the time point shown in FIG. 17B.

In this embodiment, it is assumed that the storage period of a premium image is extended from the normal period by using the remaining points converted into and exchanged for counts in a unit of 50 points.

Specifically, when 30 days have passed since a premium image is uploaded as shown in FIG. 17B, remaining points of a member are confirmed in the point manager. In a case where 50 points or more still remain, 50 points are subtracted from the remaining points of the member in the point manager, and the number of counts corresponding to 50 points, that is, 600 counts (50×12=600 counts), are used for extending storage of the premium images.

In this embodiment, the premium image has a size of 20 M bytes. Thus, in a case of storing the image for a day, 20 counts (20 M bytes×1 day=20 counts) are required. That is, in a case where 600 counts are used for extending the storage period of the premium image, the premium images can be stored in the album for 30 days (600/20=30 days) after the normal storage period.

Further, at the time the extending period of 30 days expires, in a case where 50 points or more still remain, 50 points are used again to further extend the storage period for 30 days.

It should be noted that, when the normal storage period is expired or when the storage period extended by using the remaining points is expired, a member may judge whether or not to use the remaining points to further extend the storage period. Alternatively, in the point manager, in the case where 50 points or more still remain, the storage period may be automatically extended.

As described above, by using remaining points of a member, the storage period of a premium image is extended. Accordingly, a member who has ordered a larger number of images can receive better service.

Further, preferably, a member can increase or decrease the number of counts retained depending upon the storage conditions of the images, and use the counts for a desired service.

For example, a member may further expand the system album by purchasing retention counts. Thus, it is possible to satisfy the demand of a member who wants to store more images for a long period.

On the contrary, it is considered that there is a member who cannot effectively use the storage capacity and the storage period of the system album corresponding to the number of the counts which the member is given and retains, because the member stores a small number of images not for a long period. For such member, the following process may be performed. That is, retention counts corresponding to the storage capacity and the storage period necessary for image storage are secured, and the remaining retention counts retained are converted into and exchanged for points to be used for receiving various services. Examples of the service using points include discount of printing charge and exchange of points for commercial products. Whereby, even a member who stores a small number of images not for a long period can effectively use the retention counts given.

Regarding the network system 10 as described above, in order to store more images in the center server for a longer period of time, a customer may make a plurality of member registrations with different names to secure album capacities for a plurality of customers, even though the customer is a single person. In a case where such a member receives a long-term storage service of an image in the system album, an extremely large number of images is eventually stored for a long period of time. This situation is unfavorable.

Thus, by using the retention counts, points given to a member based on the member's order track record is regarded as credibility of the member. Further, by giving the retention counts only to a member with high credibility, the member may receive better service.

In other words, regarding a service using the retention counts, other than by using the remaining points, in a case where the rank of a member is raised, a number of the counts of the album may be automatically increased and the counts may be used to expand the storage capacity of the album or extend the storage period of premium images. A member can receive those services irrespective of the course selected by the member in the album setting screen of FIG. 13.

In other words, total points managed in the point manager may be considered as credibility of a member, and a member having total points of a predetermined number or more may be allowed to store a specific image as a premium image for a long period of time in the system album.

In this embodiment, as an example, it is assumed that, in the album of a member, the maximum storage capacity of 50 M bytes and the storage period of 30 days are initially set. Further, in the album, images corresponding to 20 M bytes are stored as premium images. Further, rank C is set to the member.

In this case, explanation will be made of a case where the member accumulates total points through ordering to be raised to rank B.

Figure 18:
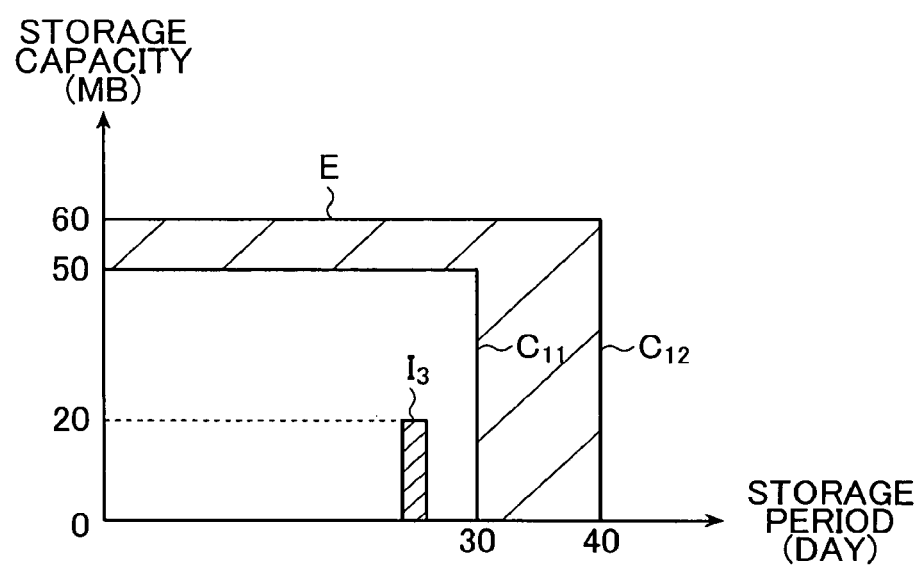
FIG. 18 is a graph showing an example of the state of the album in extending storage of the premium image using retention counts.

In FIG. 18, $C_{11}$ shows that, in the current album of the member, the maximum storage capacity of 50 M bytes, the storage period of 30 days, and the use of 1500 counts (50 M bytes×30 days) are set.

In a case where the member of rank C increases total points through ordering to be raised to rank B, the album manager adds, for example, 900 counts to 1500 counts at the time of the initial setting to increase the count of the album to 2400 counts.

Subsequently, the storage capacity and the storage period corresponding to the number of the counts are calculated. Then, the album is expanded according to the number of the increased counts. For example, the album is expanded as indicated by $C_{12}$ of FIG. 18. That is, the upper limit of the storage capacity is expanded by 10 M bytes to be 60 M bytes, and the storage period is extended by 10 days to be 40 days. In this case, the product of the numbers of M bytes and the number of days is 2400 (60 M bytes×40 days). This means that the album setting corresponds to 2400 counts.

It should be noted that the expansion of the album using the counts can be arbitrarily set by a member. Other than the example described above, any setting such as a setting of 40 M bytes×60 days or a setting of 80 M bytes×30 days is acceptable as long as the counts of the album is 2400.

Further, in this embodiment, if required by a member, 900 counts (i.e., a portion E represented by the oblique lines of FIG. 18) added due to the raise of the rank may be used to extend storage of a premium image.

That is, in the album as described above, in a case where the rank of a member having a premium image is raised, counts corresponding to a free space which is not used to store an image (900 counts at maximum in this embodiment) out of the counts added due to the raise of the rank can be allocated to the storage period of a premium image.

In this embodiment, a premium image $I_3$ has a size of 20 M bytes. Thus, by allocating the counts corresponding to the free space to the extension of the storage period of a premium image, the extending period of 45 days (900 counts/20 M bytes=45 days) can be secured at maximum. Accordingly, in this case, the premium image is stored in the album for additional 45 days after the predetermined storage period of 30 days.

Further, a member may arbitrarily decide how to use the counts corresponding to the free space. For example, in a case where there are 900 counts corresponding to the free space, 300 counts of those counts are used for extending storage of a premium image to obtain the extending period of 15 days (300 counts/20 M bytes=15 days), and the remaining 600 counts are allocated to the expansion of the maximum storage capacity of the album to expand the maximum storage capacity by 20 M bytes (600 counts/30 days=20 M bytes). As described above, the use of the counts can be desirably set according to each member.

As described above, by using the retention counts given at the time of raise of a rank of a member, the storage period of a premium image is extended. Accordingly, a member of a higher rank, that is, a member with a larger number of orders in the order track record can receive better service.

In this embodiment, images stored in the album are classified into a normal image and a premium image. Then, the remaining points or the counts given due to the raise of the rank are used to extend storage period of the premium image alone. Accordingly, a member can allocate the points or the counts only to an image which is desired to be stored for a long period of time. Thus, the use of the points or the counts possessed by the member is minimized, and the member can receive better service.

Further, by using the points given based on the order track record and the retention counts given based on credibility of a member, a premium storage service for realizing a further longer storage period is provided. With this service, a capacity of the center server can be provided for a long period of time to a member with a larger number of orders in the order track record, that is, a member with higher credibility.

In addition, a customer who makes a plurality of member registrations to falsely secure a large amount of an album capacity has a small number of orders in the order track record. Therefore, a rank of the customer is not raised, and remaining points of the customer never reach the predetermined number. Thus, such a customer cannot receive the service of the premium storage course. As a result, it is possible to prevent the capacity of the center server from being occupied by a specific customer.

As is apparent from the above description, according to the second embodiment of the image network system using the center server of the present invention, in a case where a member sets a maximum storage capacity and a storage period of the system album, the order entry channel 14 is caused to display a plurality of courses corresponding to constant retention counts as options. Then, a member is allowed to select a desired course. As a result, without placing a heavy load on the center server, the stable center server which can be readily managed can be provided. Further, a member can select a course suitable for use in setting the system album according to the member's usage regardless of gain and loss. Therefore, a member can use the album conveniently.

Further, the service which enables a longer storage period with respect to specific images based on the order track record of a member and the credibility of a member is provided. With this service, a larger capacity of the album can be provided to a member with a larger number of orders in the order track record. Simultaneously, it is possible to prevent the capacity from being occupied more than necessary by a customer who makes a plurality of member registrations to falsely secure an album capacity.

In this embodiment, the center server is provided in the network center, however, the present invention is not limited thereto. A part other than the network center, such as the retailer system and the lab system, may include the center server.

Subsequently, a third embodiment of an image network system which uses the center server of the present invention will be described in detail.

In the third embodiment, among images stored in the system album in the network center, data sizes of only the unordered images are summed up, and the data sizes of the images in the system album are managed based on whether or not the obtained data sizes of the unordered images exceeds the maximum storage capacity to notify a transmittable data size to a member. The member performs ordering, thereby enabling a larger number of images to be uploaded to the network center. As a result, a larger number of orders are placed through the network system.

Further, in a case where the capacity is overloaded in uploading an image, a countermeasure for transmitting an image is presented to a member. Accordingly, the member is allowed to upload a desired image smoothly. Regarding all the images stored in the album, including unordered images, a countermeasure for transmission of an image is presented to a member.

Figure 19:
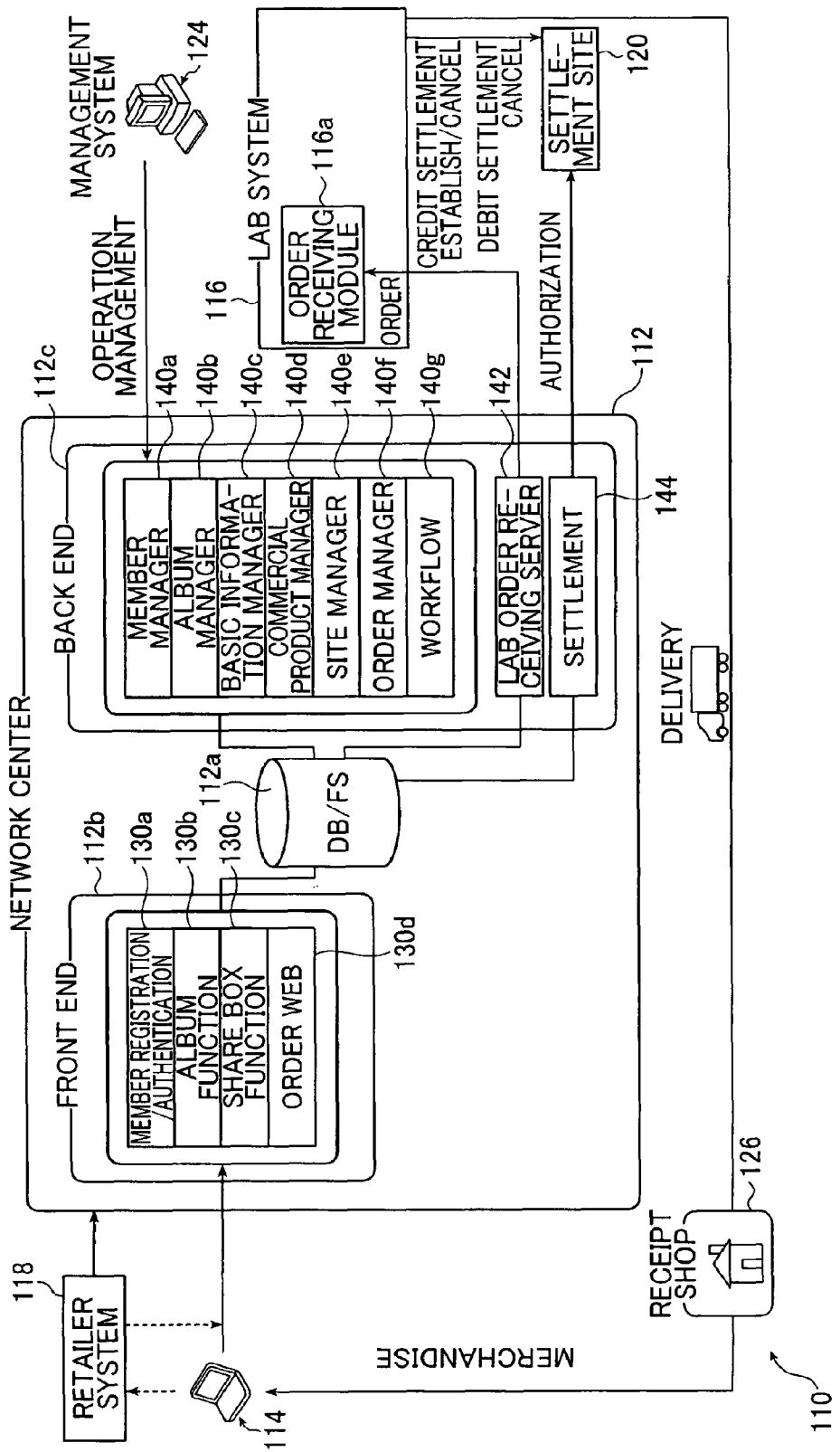
FIG. 19 is a diagram schematically showing another example of a system configuration of the image network system using the center server according to the present invention.

FIG. 19 is a conceptual diagram showing a system configuration of the image network system of the third embodiment which uses the center server of the present invention.

It should be noted that a configuration of a network system 110 shown in FIG. 19 is similar to that of the network system 10 of FIG. 1 except that the network system 110 shown in FIG. 19 does not include the point manager in the back end. Therefore, a detailed description thereof will be omitted, and a characteristic point of the network system 110 will be described hereinafter.

In this embodiment, in an order entry channel 114, each uploaded image is assigned with an order identifier for identifying if the uploaded image is an ordered image which has been ordered before, or an unordered image which has not been ordered, and is stored in the system album. In a case where an unordered image is ordered, an order identifier of the image is changed to an identifier indicating an ordered image in the network center 112.

In this embodiment, the album function includes a capacity management function. In the capacity management function, the capacity of the system album for each member is managed based only on the data size of an image (i.e., unordered image) which has not been ordered for print and the like even once.

In a case where an image is requested from the order entry channel 114 to be uploaded, a value of the total data size of unordered images in the system album and a total value of the data size of images which are requested to be uploaded are calculated based on data stored in the image information table or the order identifier in the capacity management function. Further, the total values are added. The obtained value is subtracted from the capacity (i.e., maximum storage capacity) of the system album for one member, thereby calculating the free space of the system album. In a case where a member has requested to upload an image, but the free capacity of the system album is short, a capacity overflow processing screen is displayed. Alternatively, the album function causes the order entry channel 114 to display an unordered image in the system album. This processing will be described in detail later.

Hereinafter, a data size management method of a storage image according to the third embodiment of the present invention will be described in detail.

As described above, the album function of the network center 112 has a function for storing images in the system album for each member. The system album is set in advance with the maximum storage capacity which indicates an upper limit value of the storage capacity. A member can upload an image to the network center 112 freely within the range of the maximum storage capacity. It should be noted that, as described above, the service in which an image is stored in the system album is only provided to members.

Whether or not the data size of an image stored in the system album exceeds the maximum storage capacity is judged based on the value of the total file size of unordered images among the images stored in the system album.

As described above, the network center 112 has the table (i.e., image information table) for managing the image information including the stored file size and the latest order date for each image. The album function (i.e., capacity management function) accordingly obtains a data size of each image and judges whether or not the image is an unordered image. The album function (i.e., capacity management function) then adds stored file sizes of only the unordered images in the system album, whereby the total value can be calculated.

By referring to the above-mentioned latest order date and stored file size information in the image information table, whether or not each image is an unordered image is judged and the data size of each image is obtained.

FIG. 20 shows an example of the image information table according to the third embodiment. It should be noted that the configuration of the image information table of FIG. 20 is similar to that of the image information table of FIG. 12, except that the image information table of FIG. 20 does not include the premium storage flag and the premium storage start date. Therefore, a detailed description thereof will be omitted.

The album function reads out the latest order date in the image information table for each image of a member. In a case where date information is not recorded in the latest order date, the image is recognized as an unordered image. Meanwhile, in a case of an image having date information in the latest order date, the image is recognized as an ordered image. Further, regarding the image recognized as an unordered image, file size information of a stored file size is read out. Stored file sizes read out are summed up so as to obtain a value of the total stored file size of the unordered images in the system album.

Further, as described above, an image stored in the system album is given with an order identifier for identifying whether the stored image is an ordered image and an unordered image. Accordingly, the value of the total stored file size of only the unordered images in the system album may alternatively be calculated in the following manner. That is, an unordered image is distinguished by the order identifier, and a stored file size of the distinguished image is read out from the image information table.

The album function adds the total value of the stored file size of only the unordered images in the system album and a file size of image data to be uploaded. In a case where the obtained value does not exceed the maximum storage capacity, the image is uploaded.

Figure 21:
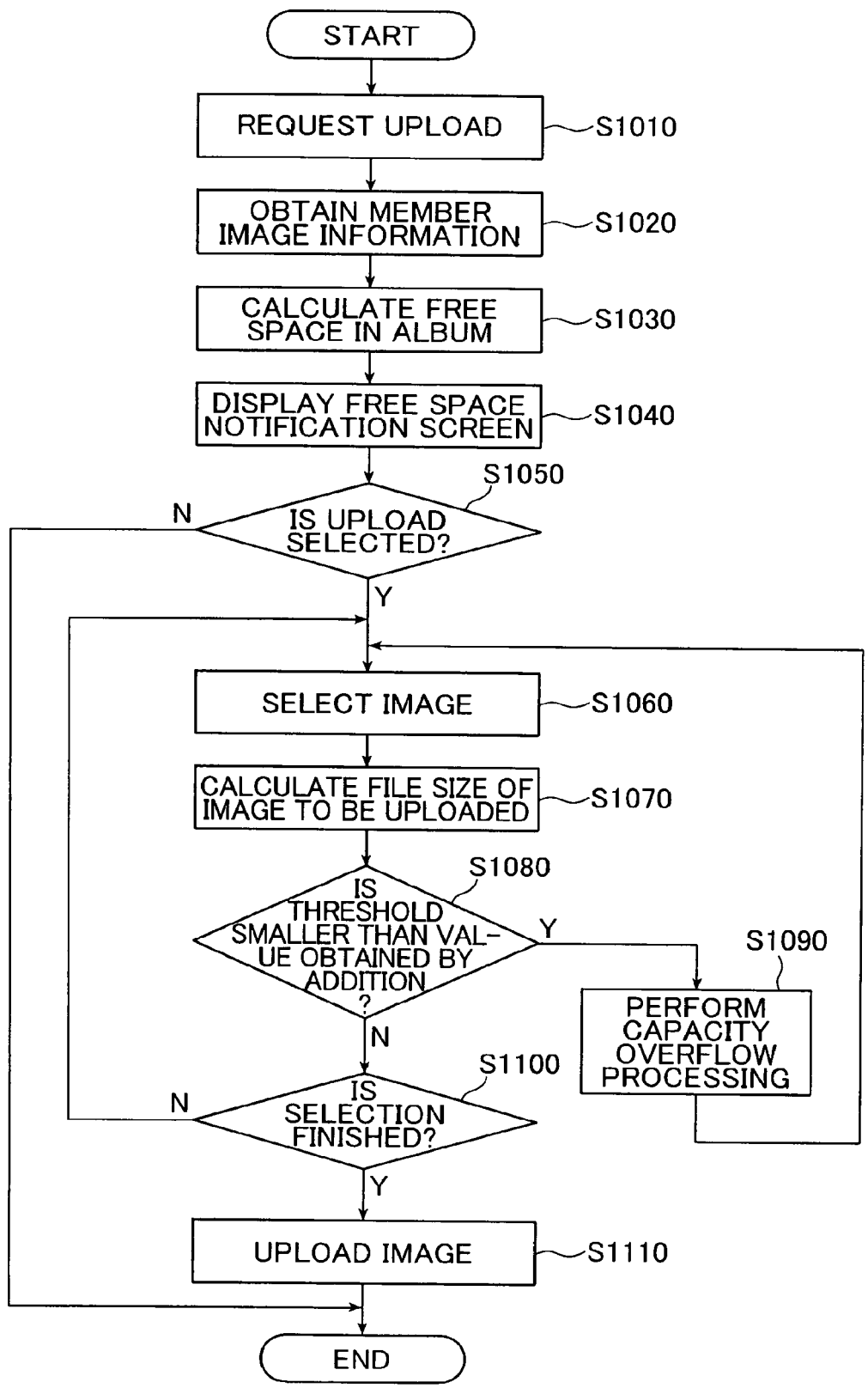
FIG. 21 is a flowchart showing processing at the time of uploading an image in the network center.

FIG. 21 is a flowchart showing a flow of processing starting from a request of uploading by a member to performing the uploading.

A member signs in to the network center 112 via the order entry channel 114. Then, the member requests to upload an image by using the album function and the order web (S1010). Then, the album function obtains information retained in the system album of the member such as a latest order date and a stored file size of each image by using the image information table (S1020).

By determining an image with no latest order date recorded as an unordered image or by determining the image as an unordered image by the order identifier in the album function, based on the obtained information, unordered images are identified, stored file sizes of respective unordered images are added, and the sum of the file sizes of the respective unordered images in the system album is calculated. Then, the album function subtracts the calculated sum of the file sizes of the unordered images from the maximum storage capacity of images to be stored in the system album to obtain the free space (S1030). The maximum storage capacity is allocated for each member and is set in advance in the album manager. The free space indicates the upper limit value of the data size of an image which can be newly uploaded to the system album by the member.

Figure 22A:
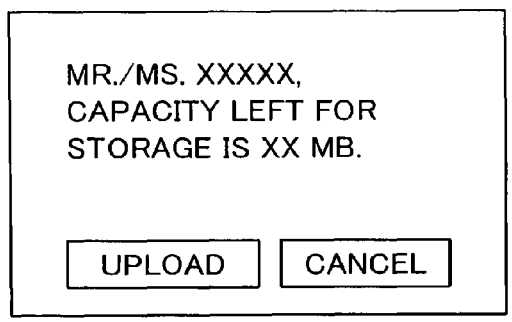
FIG. 22A is a diagram showing an example of a screen which is displayed on the order entry channel at a time of requesting uploading.

In the case where the free space is calculated, the album function causes the order entry channel 114 to display a screen for notifying the free space as shown in FIG. 22A. Then, the member is prompted to select whether or not to upload the image (S1040).

Figure 22B:
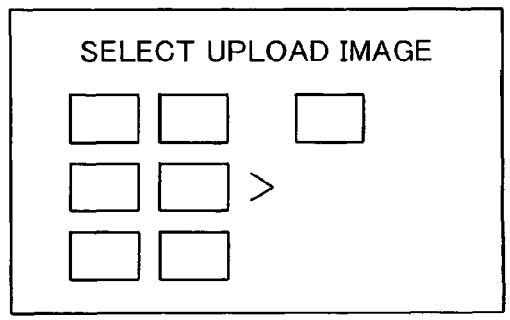
FIG. 22B is a diagram showing an example of a screen which is displayed on the order entry channel at a time of selecting an upload image.

In the screen of FIG. 22A, when a member selects the "upload" button (S1050), a screen for selecting an upload image as shown in FIG. 22B is displayed on the order entry channel 114 (S1060).

In the screen of FIG. 22B, a list of images that have been transmitted by the member using the order entry channel 114 or those that have been saved in the order entry channel 114 is displayed as thumbnail images on the left-hand side thereof. Further, the album function obtains information such as a stored file size of the displayed image. From those thumbnail images, the member uses a mouse, keyboard, or the like to select an image to be uploaded to the system album.

Every time an image is selected, the album function adds the stored file size of the selected image to the sum of the file size of all the unordered images in the system album calculated in Step S1030 (S1070).

In addition, the value obtained through the addition and the maximum storage capacity of the system album are compared (S1080). In the case where the maximum storage capacity is larger than the value obtained through the addition, the selected image is displayed on the right-hand side of the screen shown in FIG. 22B as an upload candidate image. As described above, the member can select an image within the range of the maximum storage capacity. Upon completion of the selection (S1100), the album function uploads the image selected as the upload candidate image to the system album (S1110).

Figure 23A:
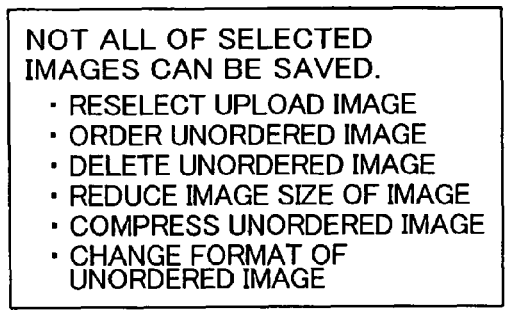
FIG. 23A is a diagram showing an example of a screen which is displayed on the order entry channel when a capacity is overloaded at the time of uploading an image.

On the other hand, when the maximum storage capacity is smaller than the value obtained through the addition as a result of comparison in Step S1080, the selected image cannot be uploaded because of insufficient free space left in the system album. In this case, the order entry channel 114 notifies the member of the shortage of the free space by alarm sound or by displaying an alarm message, and displays a selection screen of the capacity overflow processing shown in FIG. 23A (S1090). It should be noted that an alarming method is not limited to those described above.

The capacity overflow processing refers to processing that is carried out when the free space of the system album is short with respect to the file size of the image which the member wishes to be uploaded. In this embodiment, six types of processing of "reselection of an image to be uploaded", "ordering of an unordered image in the album", "deletion of the unordered image in the album", "reduction in image size of the unordered image in the album", "compression of the unordered image in the album", and "change of format of the unordered image" are displayed so that the member can select the desired processing.

When the member selects the "reselection of an image to be uploaded", the album function displays a screen for prompting the member to reselect an image from the upload candidate images as shown in FIG. 22B on the order entry channel 114. The member then sets the image selected as the upload candidate image in the screen back to a non-selected state by using a mouse, keyboard, or the like to delete the selected image, whereby selection is made again in a range that the free space does not become short.

Figure 23B:
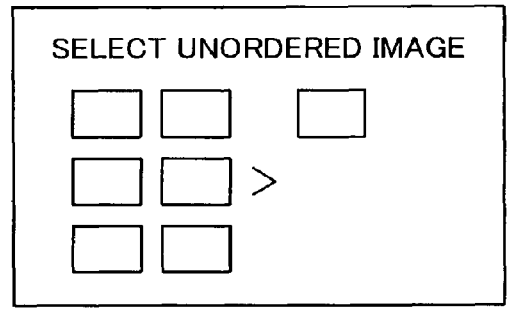
FIG. 23B is a diagram showing an example of a screen which is displayed on the order entry channel at a time of carrying out capacity overflow processing.

When the member selects the "ordering of an unordered image in the album", the order web obtains every unordered image from the system album of the member, and displays the list of unordered images on the left-hand side of the display panel of the order entry channel 114 as thumbnail images so as to display a screen for prompting the member to select an image for order on the order entry channel 114 as shown in FIG. 23B.

The member selects the image for order from the displayed unordered images by the same method as that in the screen shown in FIG. 22B. The selected unordered images, information thereof, etc. are transmitted to the order manager. The order manager carries out the order processing for the selected unordered image. At this time, the album function stores the latest order date of the image that has been subjected to the order processing, whereby the image is set as an ordered image.

Upon completion of the order processing, the album function again sums up the stored file sizes of all the unordered images in the system album of the member, to thereby recalculate the free space. Further, the screen shown in FIG. 22B is displayed again to prompt the member to select the upload image. Accordingly, the member can resume the selection of the upload image as in Step S1060, based on the recalculated stored file size of the unordered images.

When the member selects the "deletion of the unordered image in the album", the album function obtains all the unordered images of the member, causes the order entry channel 114 to display the list of unordered images on the left-hand side of the display panel as thumbnail images so as to display a screen for prompting the member to select an image to be deleted on the order entry channel 114 (FIG. 23B). From the displayed unordered images, the member selects the image to be deleted by the same method as in the screen shown in FIG. 22B. The selected unordered image is deleted from the system album by the album function.

Upon completing the deletion of the image, the album function again sums up the stored file sizes of all the unordered images in the system album of the member to thereby recalculate the free space. Further, the album function displays the screen shown in FIG. 22B again to prompt the member to select the upload image. Accordingly, the member can resume the selection of the upload image as in Step S1060 based on the recalculated stored file size of the unordered images.

When the member selects the "reduction of an image size of the unordered image in the album", the album function obtains all the unordered images of the member, causes the order entry channel 114 to display the list of unordered images on the left-hand side of the display panel as thumbnail images so as to display a screen for prompting the member to select an image that is to be reduced in image size on the order entry channel 114 (FIG. 23B). From the displayed unordered images, the member selects the image that is to be reduced in image size by the same method as in the screen shown in FIG. 22B. The selected unordered image is reduced in image size by the album function. Accordingly, the stored file size of the image is also reduced along with the above-mentioned processing.

It should be noted that the reduction of the image size may be carried out in accordance with the size that is set in advance by the album function, or may be carried out by allowing the member to select or input the image file size after the reduction of the image size on the order entry channel 114. Further, a known method such as thinning may be employed as the reduction method.

Upon completing the reduction of the image file size, the album function again sums up the stored file size of all the unordered images in the system album of the member, to thereby recalculate the free space. Further, the screen shown in FIG. 22B is displayed again to prompt the member to select the upload image. Accordingly, the member can resume the selection of the upload image as in Step S1060 based on the recalculated stored file size of the unordered images.

When the member selects the "compression of the unordered image in the album", the album function obtains all the unordered images of the member, causes the order entry channel 114 to display the list of unordered images on the left-hand side of the display panel as thumbnail images so as to display a screen for prompting the member to select the image to be compressed on the order entry channel 114 (FIG. 23B). From the displayed unordered images, the member selects the image to be compressed by the same method as in the screen shown in FIG. 22B. The selected unordered image is compressed by the album function. Accordingly, the stored file size of the image is reduced along with the above-mentioned processing.

It should be noted that the compression of the image file size may be carried out in accordance with the value set in advance by the album function, or may be carried out by allowing the member to select or input a compression format, a compression method, or the like in the order entry channel 114. Further, a known method may be employed for the compression.

Upon completing the compression of the image, the album function again sums up the stored file sizes of all the unordered images in the system album of the member, to thereby recalculate the free space. Further, the screen shown in FIG. 22B is displayed again to prompt the member to select an upload image. Accordingly, the member can resume the selection of the upload image as in Step S1060 based on the recalculated stored file size of the unordered images.

When the member selects the "change of format of the unordered image", the album function obtains all the unordered images of the member, causes the order entry channel 114 to display the list of unordered images on the left-hand side of the display panel as thumbnail images so as to display a screen for prompting the member to select the image whose format is to be changed on the order entry channel 114 (FIG. 23B). From the displayed unordered images, the member selects the image whose format is to be changed by the same method as in the screen shown in FIG. 22B. The format of the selected unordered image is changed by the album function. Thus, the stored file size of the image is reduced along with the above-mentioned processing.

Information of the image information table is used in changing the format. The album function reads out the type of the file format in the image information table with respect to the selected unordered image. When the format is, for example, RAW data, the data format is then converted into a different format such as JPEG data. Color information of the image data of the RAW data corresponds to 24 bits whereas that of the image data of the JPEG data corresponds to 8 bits. Thus, the stored file size of the unordered image is reduced by converting the image of the RAW data into JPEG data.

It should be noted that the changing of the format may be carried out by automatically judging a format in which the stored file size can be reduced in comparison with the current format for each image in the album function etc., or in accordance with the format which is selected or input by the member through the order entry channel 114. Further, a known method may be employed for the method of changing the format.

Upon completing the format change of the image, the album function again sums up the stored file sizes of all the unordered images in the system album of the member, to thereby recalculate the free space. Further, the screen shown in FIG. 22B is displayed again to prompt the member to select an upload image. Accordingly, the member can resume the selection of the upload image as in Step S1060 based on the recalculated stored file size of the unordered images.

In the above-mentioned capacity overflow processing, among the unordered images which are displayed as thumbnail images, there may be an image that has already been subjected to the processing of the image size reduction, the compression, or the format change in the previous capacity overflow processing. Thus, with respect to the image that has already been subjected to the processing of the image size reduction, the compression, or the format change, it is preferable that the processing content of the image be displayed in such a manner that the member can recognize the content.

In view of the above, a processing identifier is assigned to the image that has already been subjected to the processing of the image size reduction, the compression, or the format change so that the processed image can be identified, for example.

In displaying the thumbnail image, the album function reads the processing identifier of the displayed unordered image. When the image has already been subjected to the processing of the image size the reduction, the compression, or the format change, the album function displays the processing content that has been applied to the image in recognizable forms for the member, such as in characters or marks, together with the thumbnail image.

Alternatively, information on the processing content of each image may be held in the image information table in the capacity overflow processing, so that the album function can display the processing content by identifying the processed image based on the information held in the image information table.

It should be noted that in carrying out the capacity overflow processing, it is preferable that the upload candidate images which have been selected up to that moment on the screen shown in FIG. 22B be stored in the order entry channel 114 or the like prior to the start of the processing, and in resuming the selection of the upload image after the capacity overflow processing and after returning to the screen shown in FIG. 22B, the stored image be displayed as the upload candidate image. Accordingly, the member can resume the selection of the image from the same state as in the selection before carrying out the capacity overflow processing.

It should be noted that in the third embodiment, the free space is checked every time an image to be uploaded is selected by the member, and the capacity overflow processing is carried out if required. However, the present invention is not limited thereto and the free space may be checked after all the images to be uploaded have been selected by the member, and the capacity overflow processing may be carried out correspondingly thereto.

Further, in carrying out the capacity overflow processing after the member has selected all the images to be uploaded, the unordered images may be displayed on the order entry channel 114 in the ascending/descending order of file sizes in the selection screen of the unordered image shown in FIG. 23B. Accordingly, for example, in the case where the member wishes to upload a large number of images, the member can preferentially select unordered images of large file sizes to increase the free space of the album, which serves to assist the selection of an image.

Alternatively, the unordered images may be displayed on the order entry channel 114 in the order of dates at which the images are uploaded to the system album. With this, images with early dates can be preferentially selected.

Further, in this embodiment, the stored file size of the image selected by the member is obtained by the album function and the sum of the stored file size of images selected by the album function is calculated, to thereby compare the sum and the maximum storage capacity of the system album, or to calculate the free space. However, the present invention is not limited thereto and the order entry channel 114, the retailer system 118, the lab system 116, or the like may obtain necessary information such as file sizes to calculate the sum of the stored file size of the selected images. Further, the comparison between the sum of the stored file size of the selected images and the maximum storage capacity of the system album or the calculation of the free space can be carried out in the order entry channel 114 by transmitting the maximum storage capacity of the system album to the order entry channel 114 from the network center 112.

In addition, the display of the free space of the system album on the order entry channel 114 in Step S1040 of FIG. 21 is not carried out only at the time of receiving an upload request, but may be calculated and displayed every time the member signs in.

In the third embodiment as described above, the capacity of the system album is managed in consideration of the total file size of only the unordered images stored in the system album. However, the present invention is not limited thereto and the capacity of the system album may be managed in consideration of the total file size of all the images stored in the system album, including the ordered image.

In the case of managing the capacity of the system album considering the total file size of all the images, when the free space becomes short in the system album, the capacity overflow processing is carried out by substantially the same construction and method as in the embodiment considering the total file size of only the unordered images as described above.

When considering the total file size of all the images, the album function does not carry out the identification of the unordered image by the order identifier, and sums up the file sizes of all the images stored in the system album. When the value obtained by adding the sum and the file size of the image data to be uploaded does not exceed the maximum storage capacity, the image is uploaded. When the value exceeds the maximum storage capacity, the capacity overflow processing is carried out.

In the case of carrying out the capacity overflow processing, the order entry channel 114 displays the five types of processing of "reselection of an image to be uploaded", "deletion of the image in the album", "reduction in image size of the image in the album", "compression of the image in the album", and "change of format of the image", and prompts the member to select the desired processing. Those types of processing can be carried out for all the images in the system album irrespective of whether the image is an ordered image or an unordered image.

It is only necessary that the processing for respective choices be carried out in the same manner as in the embodiment considering the file size of only the unordered image as described above, irrespective of whether the image is an ordered image or an unordered image.

As described above, also by managing the capacity of the system album considering the total file size of all the images, the member can select and execute the countermeasure on the spot in the case of exceeding the maximum storage capacity of the album, whereby the desired image can be stored in the album smoothly.

As is apparent from the description above, according to the third embodiment of the present invention, the file sizes of only the unordered images are summed up among the images stored in the system album of the network center 112, and the file sizes of the images in the system album are managed based on whether the sum exceeds the maximum storage capacity or not. Further, the member is notified of the transmittable file size. Placement of an order allows the member to upload more images to the network center 112. Thus, the order in the network system 110 is promoted.

Further, in uploading the image in the network center 112, when the capacity is overloaded, the member can upload the desired image smoothly since the countermeasure for transmitting the image is presented to the member and the member can select and execute the countermeasure on the spot. Accordingly, the image can be stored in the album smoothly in the desired manner of the member.

In addition, the countermeasure for transmitting the image can be presented to the member not only with respect to the unordered image but also with respect to all the images stored in the album, whereby the member can store the desired image in the album smoothly even in the case of exceeding the maximum storage capacity.

As described above, the center server of the image network system according to the present invention has been described in detail. However, the present invention is not limited to the embodiments above, and may of course be variously changed or modified within the range that does not depart from the gist of the present invention.

The above described first to third embodiments may be performed either alone or in any combination of two or three of them appropriately. For example, in the first embodiment, the album setting may be made according to the storage condition based on the retention counts in the second embodiment, and further, the overflow processing of the third embodiment may be performed in the case of a capacity shortage of an album. Similarly, it is possible to perform the first and the second embodiments, the first and the third embodiments, or the second and the third embodiments, in combination.

What is claimed is:

1. A server for an image network system, connecting a user terminal via a communication network, for receiving image data of one or more images to be uploaded from the user terminal via the communication network, comprising:
    an image storage unit which stores the received image data of the one or more images uploaded from the user terminal via the communication network;
    an image management unit which manages for each user the image data received from the user terminal; and
    a capacity management unit which obtains for each user a total value of a storage capacity of the image data stored by the image storage unit, and manages whether or not the total value is within such a range as not to exceed a predetermined upper limit value of the storage capacity for each user,
    wherein in a case where the capacity management unit judges that the total value for an user exceeds the predetermined upper limit value for the user, the capacity management unit notifies the user terminal of the user and causes the user terminal of the user to display thereon one or more countermeasures for preventing the total value for the user from exceeding the predetermined upper limit value for the user,
    wherein
    before the one or more countermeasures are carried out, one or more images which have been selected up for uploading and are not stored by the image storage unit because the total value exceeds the predetermined upper limit value are stored as one or more upload candidate images in the user terminal or the server,
    after the one or more countermeasures have been carried out, the one or more upload candidate images stored in the user terminal or the server are displayed on the user terminal to cause the user to select up again one or more images for uploading in the one or more upload candidate images.

2. The server according to claim 1, wherein
    the image storage unit stores the image data of the uploaded one or more images as an album managed for each user by the image management unit,
    the capacity management unit causes the user terminal of the user to display thereon as the one or more countermeasures at least one of reselection of an image to be uploaded, deletion of the image in the album, reduction in image size of the image in the album, compression of the image in the album, and change of format of the image.

3. The server according to claim 1, wherein one or more upload candidate images to be selected up for uploading are displayed as one or more thumbnail images on the user terminal for selecting of the user in case that the one or more images of the user are uploaded from the user terminal to the server.

4. The server according to claim 1, wherein, every time an image to be uploaded is selected by the user terminal, the capacity management unit calculates a capacity of image data of the selected image, adds the capacity of image data of the selected image to the total value of the capacity of the image data of the images which have been already stored in the image storage unit to obtain an added total value, and judges whether or not the added total value exceeds the predetermined upper limit value of the storage capacity for each user.

5. The server according to claim 1, wherein, when all images to be uploaded have been selected by the user terminal, the capacity management unit calculates a capacities of image data of the selected all images, adds the capacities of image data of the selected all images to the total value of the capacity of the image data of the images which have been already stored in the image storage unit to obtain an added total value, and judges whether or not the added total value exceeds the predetermined upper limit value of the storage capacity for each user.

6. The server according to claim 1, further comprising:
    a member registration/authentication unit which registers members, changes registered member information, and authenticates registered members;
    a digital album unit which uploads an image through the user terminal, stores images of each member as a digital album in the image storage unit, enables the member to display one or more album images in the own digital album through the user terminal to enable the member to view the one or more album images, and enables the member to rotate the displayed one or more album images or view them in a slide show; and
    a share box unit which enables the member to publicly offer the one or more album images in the own digital album to a third party.

7. An image network system comprising:
    the server according to claim 1; and
    user terminals, each transmitting image data of one or more images for uploading to the server.

8. A method of storing and managing image data, comprising:
    receiving image data of one or more images to be uploaded from a user terminal via a communication network with a server for an image network system connecting the user terminal via a communication network;
    storing the received image data of the one or more images uploaded from the user terminal via the communication network with the server;
    managing for each user the image data received from the user terminal with the server;
    obtaining for each user a total value of a storage capacity of the image data stored by the image storage unit with the server;
    managing whether or not the total value is within such a range as not to exceed a predetermined upper limit value of the storage capacity for each user with the server; and
    in a case where the capacity management unit judges that the total value for an user exceeds the predetermined upper limit value for the user, notifying the user terminal of the user with the server and causing the user terminal of the user with the server to display thereon one or more countermeasures for preventing the total value for the user from exceeding the predetermined upper limit value for the user, wherein before the one or more countermeasures are carried out, storing one or more images which have been selected up for uploading and are not stored by the image storage unit because the total value exceeds the predetermined upper limit value as one or more upload candidate images in the user terminal or the server, and, after the one or more countermeasures have been carried out, displaying the one or more upload candidate images stored in the user terminal or the server on the user terminal to cause the user to select up again one or more images for uploading in the one or more upload candidate images.

* * * * *